US006995355B2

(12) United States Patent
Rains, Jr. et al.

(10) Patent No.: US 6,995,355 B2
(45) Date of Patent: Feb. 7, 2006

(54) OPTICAL INTEGRATING CHAMBER LIGHTING USING MULTIPLE COLOR SOURCES

(75) Inventors: Jack C. Rains, Jr., Herndon, VA (US); Don F. May, Vienna, VA (US); David P. Ramer, Reston, VA (US)

(73) Assignee: Advanced Optical Technologies, LLC, Herndon, VA (US)

( * ) Notice: Subject to any disclaimer, the term of this patent is extended or adjusted under 35 U.S.C. 154(b) by 101 days.

(21) Appl. No.: 10/832,464

(22) Filed: Apr. 27, 2004

(65) Prior Publication Data

US 2005/0161586 A1 Jul. 28, 2005

Related U.S. Application Data

(63) Continuation-in-part of application No. 10/601,101, filed on Jun. 23, 2003.

(51) Int. Cl.
*F21V 9/00* (2006.01)

(52) U.S. Cl. .................. 250/228; 362/235; 362/317

(58) Field of Classification Search ............... 250/218, 250/228; 315/134, 149, 312; 356/235, 236, 356/341; 106/425, 426, 635; 362/3, 6, 16, 362/234, 235, 255, 256, 257, 265, 317

See application file for complete search history.

(56) References Cited

U.S. PATENT DOCUMENTS

| 4,677,533 | A | 6/1987 | McDermott et al. |
| 4,992,704 | A | 2/1991 | Stinson |
| 5,400,228 | A | 3/1995 | Kao |
| 5,752,766 | A | 5/1998 | Bailey et al. |
| 5,838,247 | A | 11/1998 | Bladowski |
| 5,877,490 | A | 3/1999 | Ramer et al. |
| 5,899,557 | A | 5/1999 | McDermott |
| 5,914,487 | A | 6/1999 | Ramer et al. |
| 6,007,225 | A | 12/1999 | Ramer et al. |
| 6,084,250 | A | 7/2000 | Justel et al. |
| 6,139,166 | A | 10/2000 | Marshall et al. |
| 6,149,283 | A | 11/2000 | Conway et al. |
| 6,150,774 | A | 11/2000 | Mueller et al. |
| 6,166,496 | A | 12/2000 | Lys et al. |
| 6,183,086 | B1 | 2/2001 | Neubert |
| 6,184,628 | B1 | 2/2001 | Ruthenberg |

(Continued)

OTHER PUBLICATIONS

"Developmental Product Technical Data Bulletin" FERRO Corporation- Speciality Plastics Group, Filed and Reinforced Plastics Division, Evansville, IN.

(Continued)

*Primary Examiner*—Stephone B. Allen
(74) *Attorney, Agent, or Firm*—McDermott Will & Emery LLP

(57) ABSTRACT

A system to provide radiant energy of selectable spectral characteristic (e.g. a selectable color combination of light) uses an optical integrating cavity to combine energy of different wavelengths from different sources. Sources of radiant energy of different wavelengths, typically different-color LEDs, supply radiant energy into the interior of the cavity. The cavity has a diffusely reflective interior surface and an aperture for allowing emission of combined radiant energy. Control of the intensity of emission of the sources sets the amount of each wavelength of energy in the combined output and thus determines a spectral characteristic of the radiant energy output through the aperture. A variety of different elements may optically process the combined light output, such a deflector, a variable iris, a lens, a variable focusing lens system, a collimator, a holographic diffuser and combinations thereof. Such systems are useful in various luminous applications as well as various illumination applications.

46 Claims, 13 Drawing Sheets

U.S. PATENT DOCUMENTS

| | | |
|---|---|---|
| 6,200,002 B1 | 3/2001 | Marshall et al. |
| 6,222,623 B1 | 4/2001 | Wetherell |
| 6,238,077 B1 | 5/2001 | Ramer et al. |
| 6,257,737 B1 | 7/2001 | Marshall et al. |
| 6,266,136 B1 | 7/2001 | Ramer et al. |
| 6,273,589 B1 | 8/2001 | Weber et al. |
| 6,280,054 B1 | 8/2001 | Cassarly et al. |
| 6,286,979 B1 | 9/2001 | Ramer et al. |
| 6,299,329 B1 | 10/2001 | Mui et al. |
| 6,334,700 B2 | 1/2002 | Ramer et al. |
| 6,340,868 B1 | 1/2002 | Lys et al. |
| 6,342,695 B1 | 1/2002 | Ramer et al. |
| 6,459,919 B1 | 10/2002 | Lys et al. |
| 6,488,389 B2 | 12/2002 | Cassarly et al. |
| 6,523,977 B2 | 2/2003 | Chuang et al. |
| 6,525,668 B1 | 2/2003 | Petrick |
| 6,527,411 B1 | 3/2003 | Sayers |
| 6,533,429 B2 | 3/2003 | Yoneda |
| 6,547,416 B2 | 4/2003 | Pashley et al. |
| 6,626,558 B2 | 9/2003 | Momot et al. |
| 6,636,003 B2 | 10/2003 | Rahm et al. |
| 6,659,622 B2 | 12/2003 | Katogi et al. |
| 6,692,136 B2 | 2/2004 | Marshall et al. |
| 6,700,112 B2 | 3/2004 | Brown |
| 6,744,223 B2 | 6/2004 | Laflamme et al. |
| 6,759,814 B2 | 7/2004 | Vogel et al. |
| 6,793,374 B2 | 9/2004 | Begemann |
| 6,806,659 B1 | 10/2004 | Mueller et al. |
| 6,840,652 B1 | 1/2005 | Hymer |
| 2002/0064043 A1 | 5/2002 | Ariga et al. |
| 2003/0117796 A1* | 6/2003 | Voser ..................... 362/231 |
| 2003/0193816 A1 | 10/2003 | Rahn |
| 2004/0156199 A1 | 8/2004 | Rivas et al. |
| 2005/0040774 A1 | 2/2005 | Mueller et al. |
| 2005/0156103 A1 | 7/2005 | May et al. |
| 2005/0161586 A1 | 7/2005 | Rains et al. |

OTHER PUBLICATIONS

"Industrial Equipment News . . . The Leading Publisher of New Products Worldwide" IEN, Apr. 2003—www.inquiryexpress.com.

"Holographic Diffusers", EO Edmund Industrial Optics, available at http://www.edmundoptics.com/onlinecatalog/DisplayProduct.cfm?productid=1683 "Source for Revolution", 2003.

Steigerwald, Daniel A., et al. "Illumination With Solid State Lighting Technology." IEEE Journal on Selected Topics in Quantum Electronics, vol. 8, No. 2, Mar./Apr. 2002, pp. 310-320.

Xiang, Hector, "efg's Chromaticity Diagrams Lab Report." URL:http://www.efgw.com/Lab/Graphics/Colors/Chromaticity.htm pp. 1-15.

Tawil, Joe., et al. "Colorimetry." URL:http://www.camera-guild.com/technology/colrimetry.htm pp. 1-13.

* cited by examiner

Fig. 5
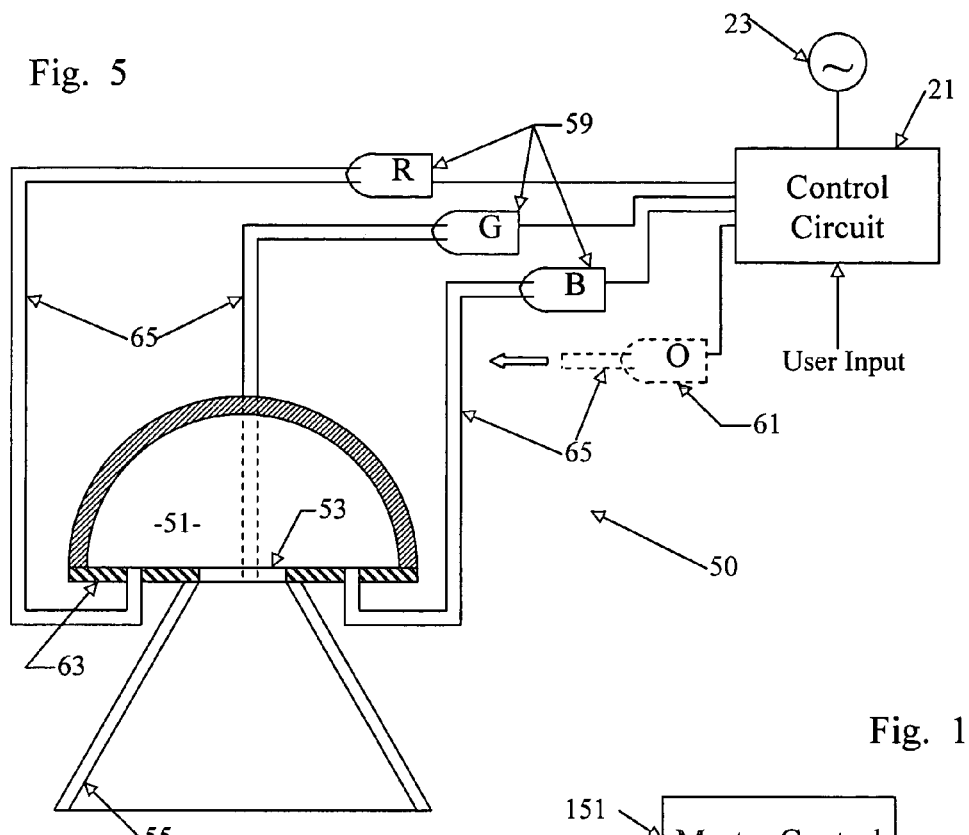
Fig. 12
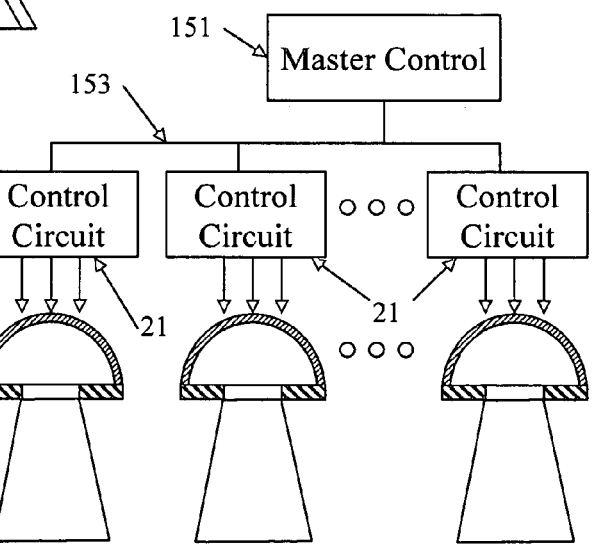
Fig. 13
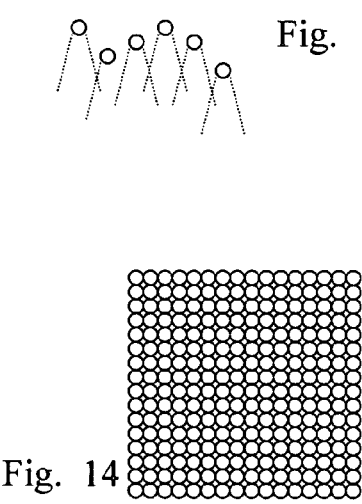
Fig. 14

OPTICAL INTEGRATING CHAMBER LIGHTING USING MULTIPLE COLOR SOURCES

CROSS-REFERENCE TO RELATED APPLICATION

This application is a continuation-in-part and claims the benefit of the filing date of U.S. patent application Ser. No. 10/601,101, filed Jun. 23, 2003, entitled "Integrating Chamber Cone Light Using LED Sources," the disclosure of which is entirely incorporated herein by reference.

TECHNICAL FIELD

The present subject matter relates to techniques and equipment to provide radiant energy having a selectable spectral characteristic (e.g. a selectable color characteristic), by combining selected amounts of radiant energy of different wavelengths from different sources, using an optical cavity.

BACKGROUND

An increasing variety of lighting applications require a precisely controlled spectral characteristic of the radiant energy. It has long been known that combining the light of one color with the light of another color creates a third color. For example, the commonly used primary colors Red, Green and Blue of different amounts can be combined to produce almost any color in the visible spectrum. Adjustment of the amount of each primary color enables adjustment of the spectral properties of the combined light stream. Recent developments for selectable color systems have utilized light emitting diodes as the sources of the different light colors.

Light emitting diodes (LEDs) were originally developed to provide visible indicators and information displays. For such luminance applications, the LEDs emitted relatively low power. However, in recent years, improved LEDs have become available that produce relatively high intensities of output light. These higher power LEDs, for example, have been used in arrays for traffic lights. Today, LEDs are available in almost any color in the color spectrum.

Systems are known which combine controlled amounts of projected light from at least two LEDs of different primary colors. Attention is directed, for example, to U.S. Pat. Nos. 6,459,919, 6,166,496 and 6,150,774. Typically, such systems have relied on using pulse-width modulation or other modulation of the LED driver signals to adjust the intensity of each LED color output. The modulation requires complex circuitry to implement. Also, such prior systems have relied on direct radiation or illumination from the individual source LEDs. In some applications, the LEDs may represent undesirably bright sources if viewed directly. Also, the direct illumination from LEDs providing multiple colors of light has not provided optimum combination throughout the field of illumination. In some systems, the observer can see the separate red, green and blue lights from the LEDs at short distances from the fixture, even if the LEDs are covered by a translucent diffuser. Integration of colors by the eye becomes effective only at longer distances.

Another problem arises from long-term use of LED type light sources. As the LEDs age, the output intensity for a given input level of the LED drive current decreases. As a result, it may be necessary to increase power to an LED to maintain a desired output level. This increases power consumption. In some cases, the circuitry may not be able to provide enough light to maintain the desired light output level. As performance of the LEDs of different colors declines differently with age (e.g. due to differences in usage), it may be difficult to maintain desired relative output levels and therefore difficult to maintain the desired spectral characteristics of the combined output. The output levels of LEDs also vary with actual temperature (thermal) that may be caused by difference in ambient conditions or different operational heating and/or cooling of different LEDs. Temperature induced changes in performance cause changes in the spectrum of light output.

Another problem with existing multi-color LED systems arises from control of the overall system output intensity. In existing systems, to adjust the combined output intensity, e.g. to reduce or increase overall brightness, the user must adjust the LED power levels. However, LED spectral characteristics change with changes in power level. If the light colors produced by the LEDs change, due to a power level adjustment, it becomes necessary to adjust the modulations to compensate in order to achieve the same spectral characteristic.

U.S. Pat. No. 6,007,225 to Ramer et al. (Assigned to Advanced Optical Technologies, L.L.C.) discloses a directed lighting system utilizing a conical light deflector. At least a portion of the interior surface of the conical deflector has a specular reflectivity. In several disclosed embodiments, the source is coupled to an optical integrating cavity; and an outlet aperture is coupled to the narrow end of the conical light deflector. This patented lighting system provides relatively uniform light intensity and efficient distribution of light over a field of illumination defined by the angle and distal edge of the deflector. However, this patent does not discuss particular color combinations or effects.

Hence, a need still exists for a technique to efficiently combine energy from multiple sources having multiple wavelengths and direct the radiant energy effectively toward a desired field of illumination. A related need still exists for such a system that does not require complex electronics (e.g. modulation circuitry) to control the intensity of the energy output from the sources of the radiant energy of different wavelengths. A need also exists for a technique to effectively maintain a desired energy output level and the desired spectral character of the combined output as LED performance decreases with age, preferably without requiring excessive power levels.

SUMMARY

As disclosed herein, an apparatus for emitting radiant energy includes an optical cavity, having a diffusely reflective interior surface and an aperture for allowing emission of combined radiant energy. Sources supply radiant energy into the interior of the cavity. At least two of the sources emit radiant energy of different wavelengths. The cavity effectively combines the energy of the different wavelengths, so that the radiant energy emitted through the aperture includes the radiant energy of the various wavelengths. The apparatus also includes an optical processing element coupled to the aperture of the optical cavity.

A variety of different optical processing elements are disclosed. Individual examples may be selected or two or more such elements may be used in combination, to facilitate use of the apparatus for a particular luminance or illumination application. Disclosed examples of the optical processing element include deflectors of various shapes and reflective characteristics, collimators, various lenses, focusing systems, irises, diffusers, holographic diffusers and the like.

A system using an apparatus as disclosed herein will include a control circuit, coupled to the sources for establishing output intensity of radiant energy of each of the sources. Control of the intensity of emission of the sources sets a spectral characteristic of the combined radiant energy emitted through the aperture. If the fixture includes a variable iris, the output intensity may be adjusted by adjustment of the iris opening without the need to change the power levels of the sources, and thus without impact on the spectral characteristic of the output.

In the examples, the points of entry of the energy from the sources into the cavity are located so that the emission points are not directly visible through the aperture. Each source typically comprises one or more light emitting diodes (LEDs). It is possible to install any desirable number of LEDs. Hence, In several examples, the sources may comprise one or more LEDs for emitting light of a first color, and one or more LEDs for emitting light of a second color, wherein the second color is different from the first color. In a similar fashion, the apparatus may include additional LED sources of a third color, a fourth color, etc. To achieve the highest color-rendering index (CRI), the LED array may include LEDs of colors that effectively cover the entire visible spectrum.

The sources can include any color or wavelength, but typically include red, green, and blue. The integrating or mixing capability of the optical cavity serves to project light of any color, including white light, by adjusting the intensity of the various sources coupled to the cavity. Hence, it is possible to control color rendering index, as well as color temperature. The system works with the totality of light output from a family of LEDs. However, to provide color adjustment or variability, it is not necessary to control the output of individual LEDs, except as the intensity of each contributes to the totality. For example, it is not necessary to modulate the LED outputs. Also, the distribution pattern of the LEDs is not significant. The LEDs can be arranged in any manner to supply radiant energy within the optical cavity, although typically direct view from outside the fixture is avoided.

Other examples are disclosed which include one or more white light sources. The white light source may be one or more white LEDs. Alternatively, such fixtures may utilize other light sources or lamps, such as incandescent or fluorescent light bulbs. In fixtures utilizing white light sources, the light from the colored LEDs provides an adjustment or correction to the white light output of the apparatus.

An exemplary system includes a number of "sleeper" LEDs that would be activated only when needed, for example, to maintain the light output, color, color temperature or thermal temperature. Hence, examples are also disclosed in which the first color LEDs comprise one or more initially active LEDs for emitting light of the first color and one or more initially inactive LEDs for emitting light of the first color on an as needed basis. Similarly, the second color LEDs include one or more initially active LEDs for emitting light of the second color and one or more initially inactive LEDs for emitting light of the second color on an as needed basis. In a similar fashion, the apparatus may include additional active and inactive LED sources of a third color, fourth color, etc. or active and inactive LED sources of white light.

As noted in the background, as LEDs age or experience increases in thermal temperature, they continue to operate, but at a reduced output level. The use of the sleeper LEDs greatly extends the lifecycle of the fixtures. Activating a sleeper (previously inactive) LED, for example, provides compensation for the decrease in output of the originally active LED. There is also more flexibility in the range of intensities that the fixtures may provide.

A number of different examples of control circuits are discussed below. In one example, the control circuitry comprises a color sensor coupled to detect color distribution in the combined radiant energy. Associated logic circuitry, responsive to the detected color distribution, controls the output intensity of the various LEDs, so as to provide a desired color distribution in the integrated radiant energy. In an example using sleeper LEDs, the logic circuitry is responsive to the detected color distribution to selectively activate the inactive light emitting diodes as needed, to maintain the desired color distribution in the combined radiant energy.

A number of other control circuit features also are disclosed. For example, the control circuitry may also include a temperature sensor. In such an example, the logic circuitry is also responsive to the sensed temperature, e.g. to reduce intensity of the source outputs to compensate for temperature increases.

The control circuitry may include an appropriate device for manually setting the desired spectral characteristic, for example, one or more variable resistors or one or more dip switches, to allow a user to define or select the desired color distribution.

Automatic controls also are envisioned. For example, the control circuitry may include a data interface coupled to the logic circuitry, for receiving data defining the desired color distribution. Such an interface would allow input of control data from a separate or even remote device, such as a personal computer, personal digital assistant or the like. A number of the devices, with such data interfaces, may be controlled from a common central location or device.

The control may be somewhat static, e.g. set the desired color reference index or desired color temperature and the overall intensity and leave the device set-up in that manner for an indefinite period. The apparatus also may be controlled dynamically, for example, to vary the color of the combined light output and thereby provide special effects lighting. Where a number of the devices are arranged in a large two-dimensional array, dynamic control of color and intensity of each unit could even provide a video display capability, for example, for use as a "jumbo-tron" view screen in a stadium or the like. In product lighting or in personnel lighting (for studio or theater work), the lighting can be adjusted for each product or person that is illuminated. Also, such light settings are easily recorded and reused at a later time or even at a different location using a different system.

The disclosed apparatus may use a variety of different structures or arrangements for the optical integrating cavity. It is desirable that the interior cavity surface have a highly efficient diffusely reflective characteristic, e.g. a reflectivity of over 90%, with respect to the relevant wavelengths. In several examples, the cavity is formed of a diffusely reflective plastic material, such as a polypropylene having a 98% reflectivity and a diffuse reflective characteristic. Another example of a material with a suitable reflectivity is SPECTRALON. Alternatively, the optical integrating cavity may comprise a rigid substrate having an interior surface, and a diffusely reflective coating layer formed on the interior surface of the substrate so as to provide the diffusely reflective interior surface of the optical integrating cavity.

A variety of different shapes may be used for the interior reflective surface of the cavity. Although it may be triangular or in the shape of a pyramid, in several examples, the diffusely reflective interior surface of the optical integrating cavity has a shape corresponding to a substantial portion of a sphere (e.g. hemispherical) or a substantial portion of a cylinder (e.g. approximating a half-cylinder). Other examples utilize an extended volume having a rectangular cross-section.

To provide a particular desirable output distribution from the apparatus, it is also possible to construct the cavity so as to provide constructive occlusion. Constructive Occlusion type transducer systems utilize an electrical/optical transducer optically coupled to an active area of the system, typically the aperture of a cavity or an effective aperture formed by a reflection of the cavity. The systems utilize diffusely reflective surfaces, such that the active area exhibits a substantially Lambertian characteristic. A mask occludes a portion of the active area of the system, in the examples, the aperture of the cavity or the effective aperture formed by the cavity reflection, in such a manner as to achieve a desired response or output characteristic for the system. In examples of the present apparatus using constructive occlusion, the optical integrating cavity would include a base, a mask and a cavity formed in the base or the mask. The mask would have a diffusely reflective surface. The mask is sized and positioned relative to the active area of the system so as to constructively occlude the active area.

In one example of the present apparatus using constructive occlusion, the device would further include a mask outside the optical integrating cavity formed in the base. The mask would have a diffusely reflective surface facing toward the aperture of the cavity. The mask is sized and positioned relative to the aperture so as to constructively occlude the aperture. In another constructive occlusion example, the aperture that serves as the active area is actually a reflection of the interior surface of a dome that forms the curved interior of the cavity. The reflection is formed on a base surface opposite the cavity of the dome. The interior of the cavity is diffusely reflective. In this later arrangement, the dome also serves as the constructive occlusion mask.

The inventive devices have numerous applications, and the output intensity and spectral characteristic may be tailored and/or adjusted to suit the particular application. For example, the intensity of the integrated radiant energy emitted through the aperture may be at a level for use in a lumination application or at a level sufficient for a task lighting application. Exemplary luminance lighting systems provide symbol, letter number or character display lighting, for example, for signage. Theater or studio lighting and product display lighting examples are also disclosed.

A lighting system, for providing variable color lighting for studio or theater applications, includes first and second sources of light of first and second wavelengths. An optical cavity with a diffusely reflective interior surface receives and combines light of the two wavelengths from the sources. The cavity also has an aperture, for allowing emission of combined light of both wavelengths. The lighting system also includes a variable opening iris optically coupled to the aperture of the optical cavity, for controlling an amount of the combined light emitted from the aperture directed toward a subject to be illuminated. Control circuitry, coupled to the second sources, establishes intensity of light from the sources, so as to set a spectral characteristic of the combined light directed toward the subject to be illuminated in the studio or theater.

In a theater or studio lighting system of this type, the control of the sources controls the spectral characteristic of the emitted light. As disclosed, adjustment of the size of the opening through the iris in turn controls the intensity of the overall system light output. Disclosed examples of such a system include one or more additional optical processing elements, such as a variable focusing lens system to control the size of the spot illuminated onto the subject.

A lighting fixture, for a luminous lighting application, includes light sources for supplying light of two different wavelengths. Again, an optical cavity with a diffusely reflective interior surface receives and combines light of the different wavelengths, and an aperture of the cavity allows emission of the combined light. This luminous fixture includes at least one optical processing element coupled to the aperture of the optical cavity, for processing the combined light in a manner facilitating the luminous lighting application.

In addition to the examples of the optical processing elements mentioned earlier, the examples for the luminous fixture include deflectors shaped like numbers, characters, letters, or other symbols. In such fixtures, the apertures may be similarly shaped. By contouring and combining such fixtures, it is possible to spell out words and phrases lighted in accord with the principles described herein.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 5 illustrates another example of a radiant energy emitting system, using fiber optic links from the LEDs to the optical integrating cavity.

FIG. 12 is a diagram, illustrating a number of radiant energy emitting systems with common control from a master control unit.

FIG. 13 is a layout diagram, useful in explaining an arrangement of a number of the fixtures of the system of FIG. 12.

FIG. 14 depicts the emission openings of a number of the fixtures, arranged in a two-dimensional array.

DETAILED DESCRIPTION

Figure 1:
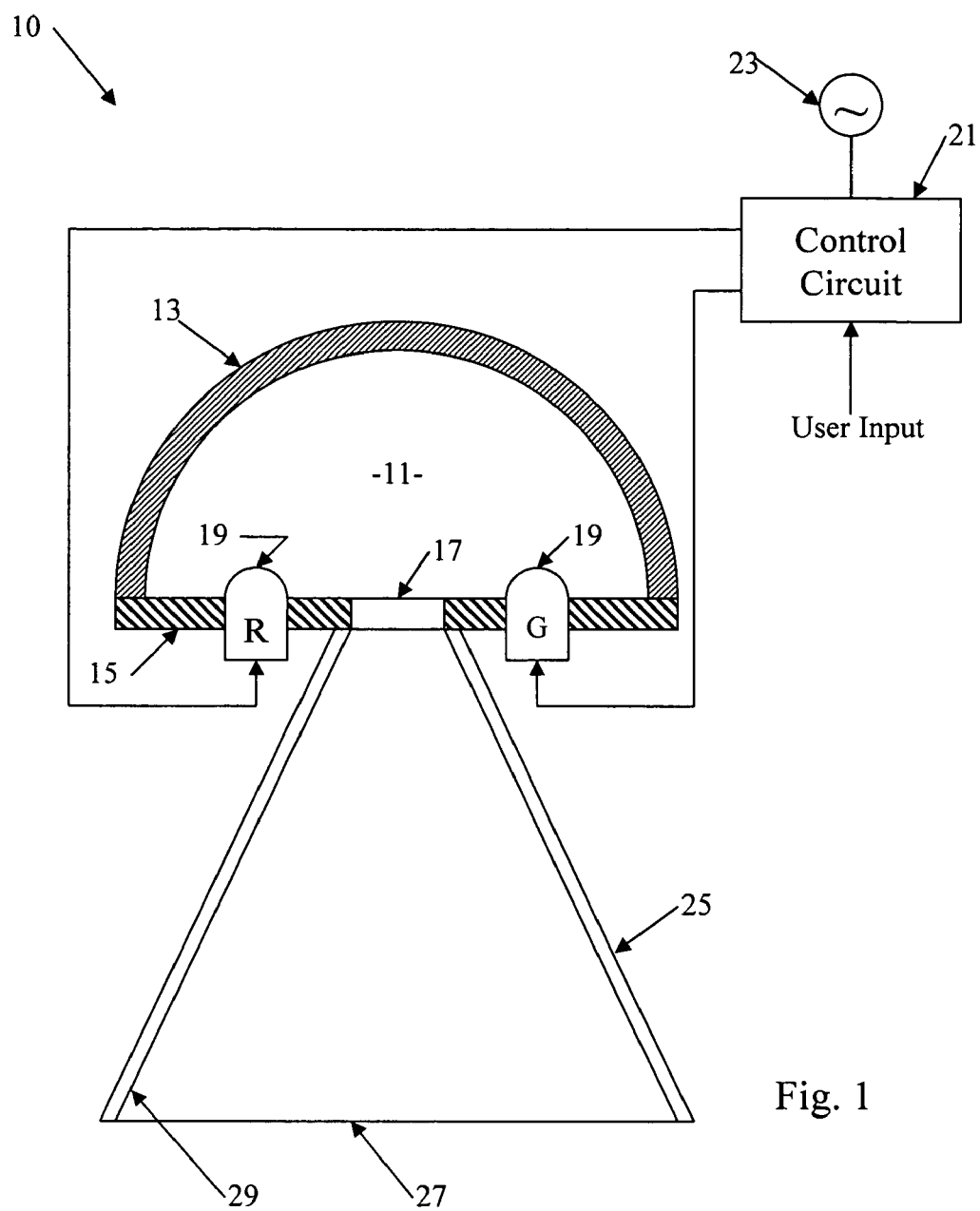
FIG. 1 illustrates an example of a radiant energy emitting system, with certain elements thereof shown in cross-section.

Reference now is made in detail to the examples illustrated in the accompanying drawings and discussed below. FIG. 1 is a cross-sectional illustration of a radiant energy distribution apparatus or system 10. For task lighting applications, the apparatus emits light in the visible spectrum, although the system 10 may be used for lumination applications and/or with emissions in or extending into the infrared and/or ultraviolet portions of the radiant energy spectrum.

The illustrated system 10 includes an optical cavity 11 having a diffusely reflective interior surface, to receive and combine radiant energy of different colors/wavelengths. The cavity 11 may have various shapes. The illustrated cross-section would be substantially the same if the cavity is hemispherical or if the cavity is semi-cylindrical with the cross-section taken perpendicular to the longitudinal axis. The optical cavity in the examples discussed below is typically an optical integrating cavity.

The disclosed apparatus may use a variety of different structures or arrangements for the optical integrating cavity, examples of which are discussed below relative to FIGS. 3–9 and 15a–24. At least a substantial portion of the interior surface(s) of the cavity exhibit(s) diffuse reflectivity. It is desirable that the cavity surface have a highly efficient reflective characteristic, e.g. a reflectivity equal to or greater than 90%, with respect to the relevant wavelengths. In the example of FIG. 1, the surface is highly diffusely reflective to energy in the visible, near-infrared, and ultraviolet wavelengths.

The cavity 11 may be formed of a diffusely reflective plastic material, such as a polypropylene having a 97% reflectivity and a diffuse reflective characteristic. Such a highly reflective polypropylene is available from Ferro Corporation—Specialty Plastics Group, Filled and Reinforced Plastics Division, in Evansville, Ind. Another example of a material with a suitable reflectivity is SPECTRALON. Alternatively, the optical integrating cavity may comprise a rigid substrate having an interior surface, and a diffusely reflective coating layer formed on the interior surface of the substrate so as to provide the diffusely reflective interior surface of the optical integrating cavity. The coating layer, for example, might take the form of a flat-white paint or white powder coat. A suitable paint might include a zinc-oxide based pigment, consisting essentially of an uncalcined zinc oxide and preferably containing a small amount of a dispersing agent. The pigment is mixed with an alkali metal silicate vehicle-binder, which preferably is a potassium silicate, to form the coating material. For more information regarding the exemplary paint, attention is directed to U.S. patent application Ser. No. 09/866,516, which was filed May 29, 2001, by Matthew Brown, which issued as U.S. Pat. No. 6,700,112 on Mar. 2, 2004.

For purposes of the discussion, the cavity 11 in the apparatus 10 is assumed to be hemispherical. In the example, a hemispherical dome 13 and a substantially flat cover plate 15 form the optical cavity 11. At least the interior facing surfaces of the dome 13 and the cover plate 15 are highly diffusely reflective, so that the resulting cavity 11 is highly diffusely reflective with respect to the radiant energy spectrum produced by the device 10. As a result, the cavity 11 is an integrating type optical cavity. Although shown as separate elements, the dome and plate may be formed as an integral unit.

The optical integrating cavity 11 has an aperture 17 for allowing emission of combined radiant energy. In the example, the aperture 17 is a passage through the approximate center of the cover plate 15, although the aperture may be at any other convenient location on the plate 15 or the dome 13. Because of the diffuse reflectivity within the cavity 11, light within the cavity is integrated before passage out of the aperture 17. In the examples, the apparatus 10 is shown emitting the combined radiant energy downward through the aperture 17, for convenience. However, the apparatus 10 may be oriented in any desired direction to perform a desired application function, for example to provide visible luminance to persons in a particular direction or location with respect to the fixture or to illuminate a different surface such as a wall, floor or table top. Also, the optical integrating cavity 11 may have more than one aperture 17, for example, oriented to allow emission of integrated light in two or more different directions or regions.

The apparatus 10 also includes sources of radiant energy of different wavelengths. In the first example, the sources are LEDs 19, two of which are visible in the illustrated cross-section. The LEDs 19 supply radiant energy into the interior of the optical integrating cavity 11. As shown, the points of emission into the interior of the optical integrating cavity are not directly visible through the aperture 17. At least the two illustrated LEDs emit radiant energy of different wavelengths, e.g. Red (R) and Green (G). Additional LEDs of the same or different colors may be provided. The cavity 11 effectively integrates the energy of different wavelengths, so that the integrated or combined radiant energy emitted through the aperture 17 includes the radiant energy of all the various wavelengths in relative amounts substantially corresponding to the relative intensities of input into the cavity 11.

The source LEDs 19 can include LEDs of any color or wavelength. Typically, an array of LEDs for a visible light application includes at least red, green, and blue LEDs. The integrating or mixing capability of the cavity 11 serves to project light of any color, including white light, by adjusting the intensity of the various sources coupled to the cavity. Hence, it is possible to control color rendering index (CRI), as well as color temperature. The system 10 works with the totality of light output from a family of LEDs 19. However, to provide color adjustment or variability, it is not necessary to control the output of individual LEDs, except as they contribute to the totality. For example, it is not necessary to modulate the LED outputs. Also, the distribution pattern of the individual LEDs and their emission points into the cavity are not significant. The LEDs 19 can be arranged in any manner to supply radiant energy within the cavity, although it is preferred that direct view of the LEDs from outside the fixture is minimized or avoided.

In this example, light outputs of the LED sources 19 are coupled directly to openings at points on the interior of the cavity 11, to emit radiant energy directly into the interior of the optical integrating cavity. The LEDs may be located to emit light at points on the interior wall of the element 13, although preferably such points would still be in regions out of the direct line of sight through the aperture 17. For ease of construction, however, the openings for the LEDs 19 are formed through the cover plate 15. On the plate 15, the openings/LEDs may be at any convenient locations.

The apparatus 10 also includes a control circuit 21 coupled to the LEDs 19 for establishing output intensity of radiant energy of each of the LED sources. The control circuit 21 typically includes a power supply circuit coupled to a source, shown as an AC power source 23. The control circuit 21 also includes an appropriate number of LED driver circuits for controlling the power applied to each of the individual LEDs 19 and thus the intensity of radiant energy supplied to the cavity 11 for each different wavelength. Control of the intensity of emission of the sources sets a spectral characteristic of the combined radiant energy emitted through the aperture 17 of the optical integrating cavity. The control circuit 21 may be responsive to a number of different control input signals, for example, to one or more user inputs as shown by the arrow in FIG. 1. Although not shown in this simple example, feedback may also be provided. Specific examples of the control circuitry are discussed in more detail later.

The aperture 17 may serve as the system output, directing integrated color light to a desired area or region to be illuminated. Although not shown in this example, the aperture 17 may have a grate, lens or diffuser (e.g. a holographic element) to help distribute the output light and/or to close the aperture against entry of moisture of debris. For some applications, the system 10 includes an additional deflector to distribute and/or limit the light output to a desired field of illumination. A later embodiment, for example, uses a colliminator.

The color integrating energy distribution apparatus may also utilize one or more conical deflectors having a reflective inner surface, to efficiently direct most of the light emerging from a light source into a relatively narrow field of view. Hence, the exemplary apparatus shown in FIG. 1 also comprises a conical deflector 25. A small opening at a proximal end of the deflector is coupled to the aperture 17 of the optical integrating cavity 11. The deflector 25 has a larger opening 27 at a distal end thereof. The angle and distal opening of the conical deflector 25 define an angular field of radiant energy emission from the apparatus 10. Although not shown, the large opening of the deflector may be covered with a transparent plate or lens, or covered with a grating, to prevent entry of dirt or debris through the cone into the system and/or to further process the output radiant energy.

The conical deflector may have a variety of different shapes, depending on the particular lighting application. In the example, where cavity 11 is hemispherical, the cross-section of the conical deflector is typically circular. However, the deflector may be somewhat oval in shape. In applications using a semi-cylindrical cavity, the deflector may be elongated or even rectangular in cross-section. The shape of the aperture 17 also may vary, but will typically match the shape of the small end opening of the deflector 25. Hence, in the example, the aperture 17 would be circular. However, for a device with a semi-cylindrical cavity and a deflector with a rectangular cross-section, the aperture may be rectangular.

The deflector 25 comprises a reflective interior surface 29 between the distal end and the proximal end. In some examples, at least a substantial portion of the reflective interior surface 29 of the conical deflector exhibits specular reflectivity with respect to the integrated radiant energy. As discussed in U.S. Pat. No. 6,007,225, for some applications, it may be desirable to construct the deflector 25 so that at least some portion(s) of the inner surface 29 exhibit diffuse reflectivity or exhibit a different degree of specular reflectivity (e.g., quasi-secular), so as to tailor the performance of the deflector 25 to the particular application. For other applications, it may also be desirable for the entire interior surface 29 of the deflector 25 to have a diffuse reflective characteristic. In such cases, the deflector 25 may be constructed using materials similar to those taught above for construction of the optical integrating cavity 11.

In the illustrated example, the large distal opening 27 of the deflector 25 is roughly the same size as the cavity 11. In some applications, this size relationship may be convenient for construction purposes. However, a direct relationship in size of the distal end of the deflector and the cavity is not required. The large end of the deflector may be larger or smaller than the cavity structure. As a practical matter, the size of the cavity is optimized to provide the integration or combination of light colors from the desired number of LED sources 19. The size, angle and shape of the deflector determine the area that will be illuminated by the combined or integrated light emitted from the cavity 11 via the aperture 17.

In the examples, each source of radiant energy of a particular wavelength comprises one or more light emitting diodes (LEDs). Within the chamber, it is possible to process light received from any desirable number of such LEDs. Hence, in several examples, the sources may comprise one or more LEDs for emitting light of a first color, and one or more LEDs for emitting light of a second color, wherein the second color is different from the first color. In a similar fashion, the apparatus may include additional sources comprising one or more LEDs of a third color, a fourth color, etc. To achieve the highest color rendering index (CRI), the LED array may include LEDs of various wavelengths that cover virtually the entire visible spectrum. Examples with additional sources of substantially white light are discussed later.

Figure 2:
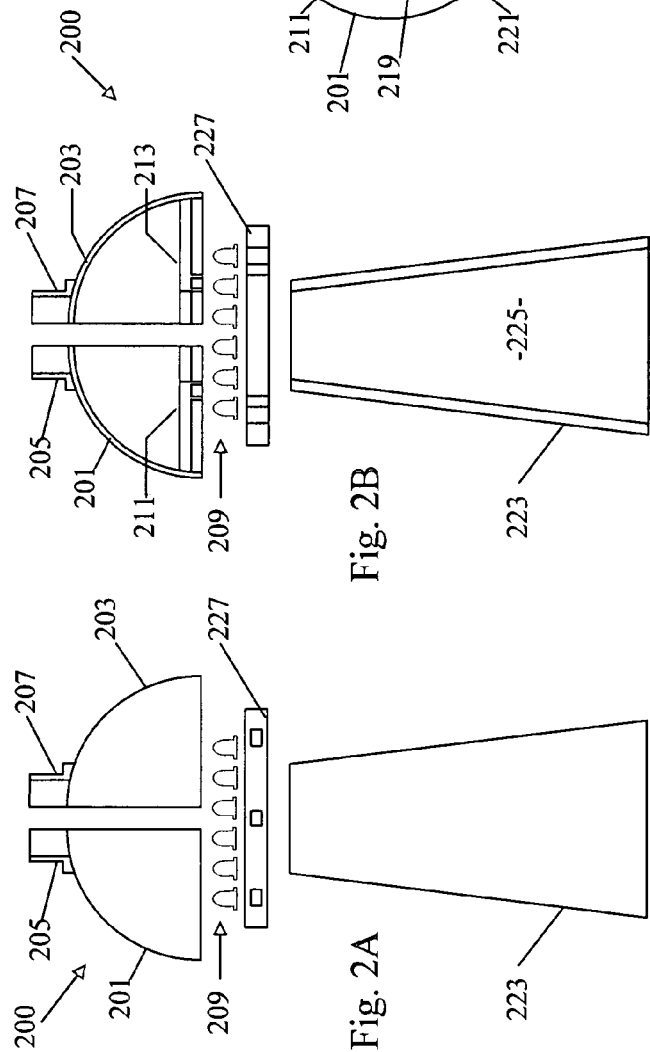
FIG. 2A is an exploded side-view of the components of a fixture usable as the cavity, deflector and sources, in the system of FIG. 1.
FIG. 2B is an exploded view of the components of FIG. 2A, with several of those components shown in cross-section.
FIG. 2C is an end view of the deflector.
FIG. 2D is an end view of the cavity assembly.
FIG. 2E is a plan view of the LED support ring.

FIGS. 2A to 2E are detail views of the light fixture components of an example of a system of the type described above relative to FIG. 1. FIG. 2A is an exploded side-view of the set 200 of the fixture components, and FIG. 2B is a similar view but showing some of those components in cross-section. As shown, the fixture elements 200 include two quarter-spherical domes 201 and 203 that are joined to form the optical integrating cavity and a portion of an LED mounting structure. The domes 201 and 203 are formed of a rigid material having a highly diffusely reflective inner surface, as discussed above.

Each dome includes a boss 205 or 207 near the back apex thereof. When the domes 201 and 203 are joined to form the cavity, the bosses 205 and 207 together form a ring-shaped back shoulder that can be used for mounting the fixture.

The illustrated components also include twelve LEDs 209 (six of which are visible in FIGS. 2A and 2B). The LEDs 209 provide different wavelengths of light as discussed earlier. In one example, the device includes six Red LEDs, three Green LEDs and three Blue LEDs.

FIG. 2D is an end view of the cavity assembly, that is to say, showing the two domes 201 and 203 joined together. As shown in cross-section in FIG. 2B, each dome includes an inwardly extending half-circular shoulder 211 or 213. When the domes are joined as in FIG. 2D, these shoulders 211, 213 together form a ring-shaped cover of the cavity. The ring-shaped cover provides one half of a sandwich like structure, for supporting the LEDs 209. The central opening 215 of the cover forms the aperture of the optical integrating cavity. Openings 221 through the cover allow passage of light from the LEDs 209 into the interior of the cavity.

The shoulders 211 and 213 include two half-circular bosses around respective portions of the inner opening 215. When the two halves of the cavity structure are joined (FIG. 2D), these bosses form two inner flanges 217 and 219, extending toward the direction of intended illumination. The groove formed between the flanges 217 and 219 receives the distal end of the conical deflector 223. FIG. 2C is an end view of the deflector 223. In the example, the entire inner surface 225 of the deflector 223 has a specular reflective characteristic.

As discussed and shown, the cavity assembly includes shoulders 211 and 213, which together form the cover plate of the cavity and form half of the LED support structure. The LEDs 209 are attached to the back (upward side in FIGS. 2A and 2B) of an LED support ring 227, which provides the other half of the LED support structure. The LED support ring 227 may be made of a suitable rigid material, which is resistant to the heat generated by the LEDs. For example, the LED support ring 227 may be constructed of aluminum, to provide the necessary structural support and to act as a heat sink to wick away a substantial portion of the heat generated by the attached LEDs 209. Although not shown, ventilation or other cooling elements may also be provided.

In this example, for each LED 209, there are six small mounting holes 229 through the LED support ring 227 (see FIG. 2E). The LED support ring 227 also has six outwardly extending 'tabs' 231 around its perimeter, to facilitate mounting. Although not shown for convenience, the cavity assembly (FIG. 2D) has three small bosses/tabs around the outside that mate to three of the six tabs 231 on the LED support ring 227.

The central passage 233 of the LED support ring 227 is somewhat larger in diameter than the proximal (small) end of the conical deflector 223. During assembly, the proximal end of the conical deflector 223 passes through the opening 233 and mates in the groove formed between the groove formed between the flanges 217 and 219. In this way, the proximal end of the deflector surrounds the aperture 215. Those skilled in the art will recognize that the structure of FIGS. 2A to 2E is exemplary and other structures may be used, for example, to mount desired numbers of LEDs and/or to couple/attach the deflector to the aperture.

Figure 3:
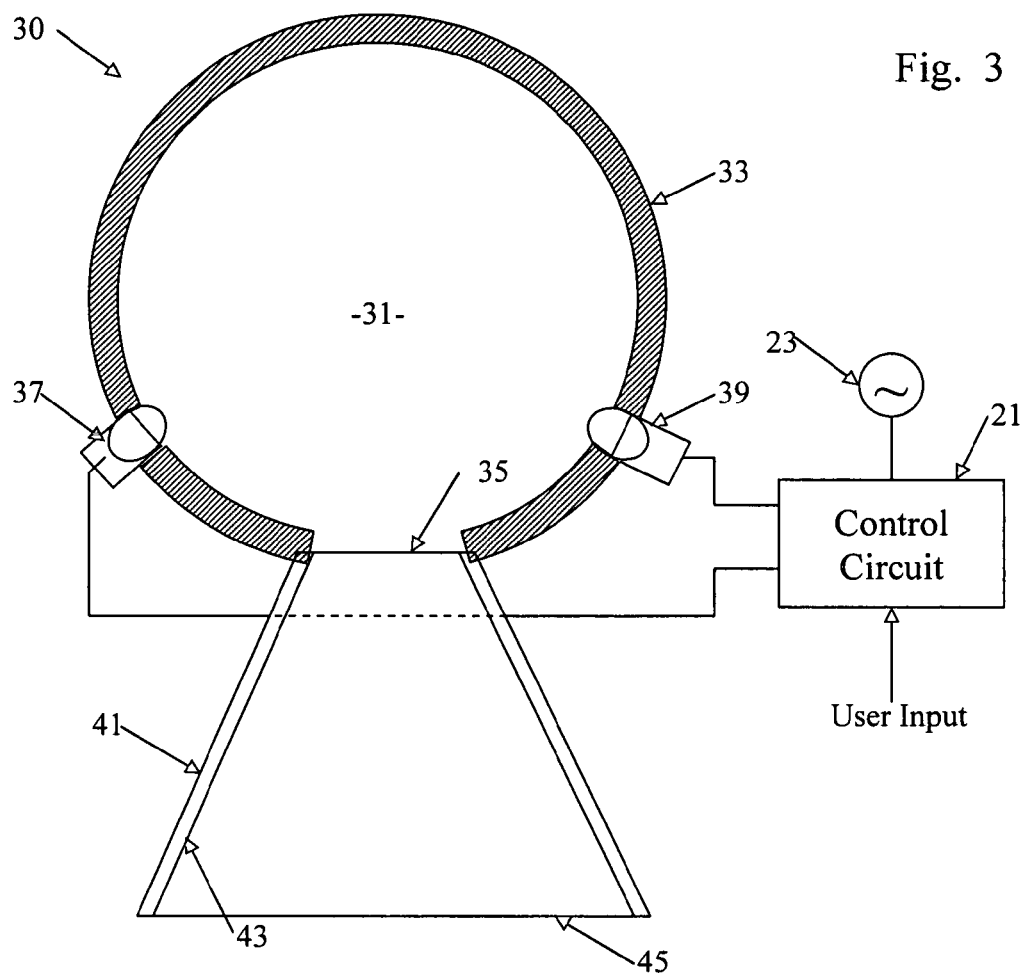
FIG. 3 illustrates another example of a radiant energy emitting system, with certain elements thereof shown in cross-section.
Figure 4:
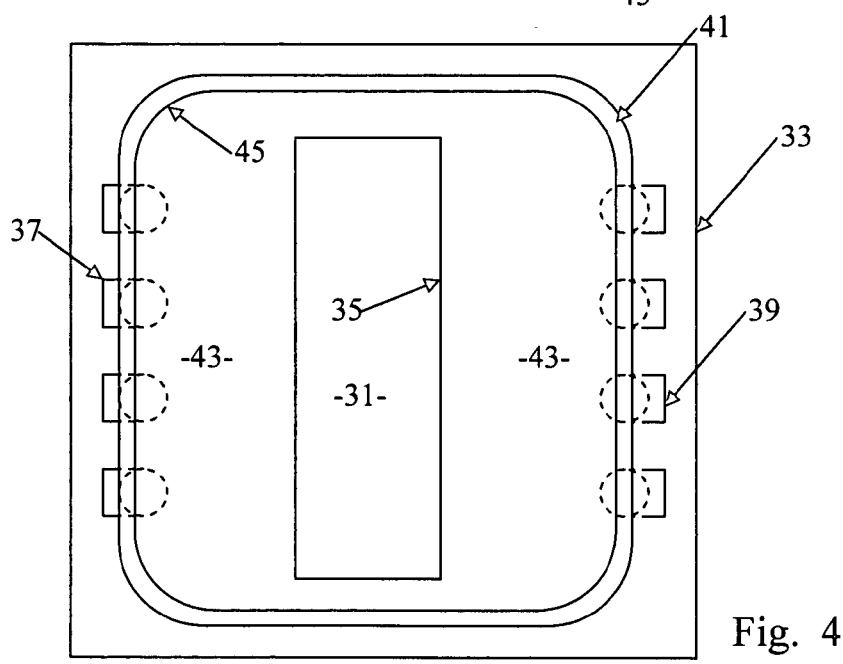
FIG. 4 is a bottom view of the fixture in the system of FIG. 3.

FIGS. 3 and 4 illustrate another example of a radiant energy distribution apparatus or system. FIG. 3 shows the overall system 30, including the fixture and the control circuitry. The fixture is shown in cross-section. FIG. 4 is a bottom view of the fixture. The system 30 is generally similar the system 10. For example, the system 30 may utilize essentially the same type of control circuit 21 and power source 23, as in the earlier example. However, the shape of the optical integrating cavity and the deflector are somewhat different.

The optical integrating cavity 31 has a diffusely reflective interior surface. In this example, the cavity 31 has a shape corresponding to a substantial portion of a cylinder. In the cross-sectional view of FIG. 3 (taken across the longitudinal axis of the cavity), the cavity 31 appears to have an almost circular shape. In this example, the cavity 31 is formed by a cylindrical element 33. At least the interior surface of the element 33 is highly diffusely reflective, so that the resulting optical cavity 31 is highly diffusely reflective and functions as an integrating cavity, with respect to the radiant energy spectrum produced by the system 30.

The optical integrating cavity 31 has an aperture 35 for allowing emission of combined radiant energy. In this example, the aperture 35 is a rectangular passage through the wall of the cylindrical element 33. Because of the diffuse reflectivity within the cavity 31, light within the cavity is integrated before passage out of the aperture 35.

The apparatus 30 also includes sources of radiant energy of different wavelengths. In this example, the sources comprise LEDs 37, 39. The LEDs are mounted in openings through the wall of the cylindrical element 33, to essentially form two rows of LEDs on opposite sides of the aperture 35. The positions of these openings, and thus the positions of the LEDs 37 and 39, typically are such that the LED outputs are not directly visible through the aperture 35, otherwise the locations are a matter of arbitrary choice.

Thus, the LEDs 37 and 39 supply radiant energy into the interior of the optical integrating cavity 31, through openings at points on the interior surface of the optical integrating cavity not directly visible through the aperture 35. A number of the LEDs emit radiant energy of different wavelengths. For example, arbitrary pairs of the LEDs 37, 39 might emit four different colors of light, e.g. Red, Green and Blue as primary colors and a fourth color chosen to provide an increased variability of the spectral characteristic of the integrated radiant energy. One or more white light sources, e.g. white LEDs, also may be provided.

Alternatively, a number of the LEDs may be initially active LEDs, whereas others are initially inactive sleeper LEDs. For example, the initially active LEDs might include two Red LEDs, two Green LEDs and a Blue LED; and the sleeper LEDs might include one Red LED, one Green LED and one Blue LED.

The control circuit 21 controls the power provided to each of the LEDs 37 and 39. The cavity 31 effectively integrates the energy of different wavelengths, from the various LEDs 37 and 39, so that the integrated radiant energy emitted through the aperture 35 includes the radiant energy of all the various wavelengths. Control of the intensity of emission of the sources, by the control circuit 21, sets a spectral characteristic of the combined radiant energy emitted through the aperture 35. If sleeper LEDs are provided, the control also activates one or more dormant LEDs, on an "as-needed" basis, when extra output of a particular wavelength or color is required.

The color integrating energy distribution apparatus 30 may also include a deflector 41 having a specular reflective inner surface 43, to efficiently direct most of the light emerging from the aperture into a relatively narrow field of view. The deflector 41 expands outward from a small end thereof coupled to the aperture 35. The deflector 41 has a larger opening 45 at a distal end thereof. The angle of the side walls of the deflector and the shape of the distal opening 45 of the deflector 41 define an angular field of radiant energy emission from the apparatus 30.

As noted above, the deflector may have a variety of different shapes, depending on the particular lighting application. In the example, where the cavity 31 is substantially cylindrical, and the aperture is rectangular, the cross-section of the deflector 41 (viewed across the longitudinal axis as in FIG. 3) typically appears conical, since the deflector expands outward as it extends away from the aperture 35. However, when viewed on-end (bottom view—FIG. 4), the openings are substantially rectangular, although they may have somewhat rounded corners. Alternatively, the deflector 41 may be somewhat oval in shape. The shapes of the cavity and the aperture may vary, for example, to have rounded ends, and the deflector may be contoured to match the aperture.

The deflector 41 comprises a reflective interior surface 43 between the distal end and the proximal end. In several examples, at least a substantial portion of the reflective interior surface 43 of the conical deflector exhibits specular reflectivity with respect to the combined radiant energy, although different reflectivity may be provided, as noted in the discussion of FIG. 1.

If provided, "sleeper" LEDs would be activated only when needed to maintain the light output, color, color temperature, and/or thermal temperature. As discussed later with regard to an exemplary control circuit, the system 30 could have a color sensor coupled to provide feedback to the control circuit 21. The sensor could be within the cavity or the deflector or at an outside point illuminated by the integrated light from the fixture.

As LEDs age, they continue to operate, but at a reduced output level. The use of the sleeper LEDs greatly extends the lifecycle of the fixtures. Activating a sleeper (previously inactive) LED, for example, provides compensation for the decrease in output of the originally active LED. There is also more flexibility in the range of intensities that the fixtures may provide.

In the examples discussed above relative to FIG. 1 to 4, the LED sources were coupled directly to openings at the points on the interior of the cavity, to emit radiant energy directly into the interior of the optical integrating cavity. It is also envisioned that the sources may be somewhat separated from the cavity, in which case, the device might include optical fibers or other forms of light guides coupled between the sources and the optical integrating cavity, to supply radiant energy from the sources to the emission points into the interior of the cavity. FIG. 5 depicts such a system 50, which uses optical fibers.

The system 50 includes an optical integrating cavity 51, an aperture 53 and a deflector with a reflective interior surface 55, similar to those in the earlier embodiments. The interior surface of the optical integrating cavity 51 is highly diffusely reflective, whereas the deflector surface 55 exhibits a specular reflectivity.

The system 50 includes a control circuit 21 and power source 23, as in the earlier embodiments. In the system 50, the radiant energy sources comprise LEDs 59 of three different wavelengths, e.g. to provide Red, Green and Blue light respectively. The sources may also include one or more additional LEDs 61, either white or of a different color or for use as 'sleepers,' similar to the example of FIGS. 3 and 4. In this example (FIG. 5), the cover plate 63 of the cavity 51 has openings into which are fitted the light emitting distal ends of optical fibers 65. The proximal light receiving ends of the fibers 65 are coupled to receive light emitted by the LEDs 59 (and 61 if provided). In this way, the LED sources 59, 61 may be separate from the chamber 51, for example, to allow easier and more effective dissipation of heat from the LEDs. The fibers 65 transport the light from the LED sources 59, 61 to the cavity 51. The cavity 51 integrates the different colors of light from the LEDs as in the earlier examples and supplies combined light out through the aperture 53. The deflector, in turn, directs the combined light to a desired field. Again, the intensity control by the circuit 21 adjusts the amount or intensity of the light of each type provided by the LED sources and thus controls the spectral characteristic of the combined light output.

A number of different examples of control circuits are discussed below. In one example, the control circuitry comprises a color sensor coupled to detect color distribution in the integrated radiant energy. Associated logic circuitry, responsive to the detected color distribution, controls the output intensity of the various LEDs, so as to provide a desired color distribution in the integrated radiant energy. In an example using sleeper LEDs, the logic circuitry is responsive to the detected color distribution to selectively activate the inactive light emitting diodes as needed, to maintain the desired color distribution in the integrated radiant energy.

To provide a uniform output distribution from the apparatus, it is also possible to construct the optical cavity so as to provide constructive occlusion. Constructive Occlusion type transducer systems utilize an electrical/optical transducer optically coupled to an active area of the system, typically the aperture of a cavity or an effective aperture formed by a reflection of the cavity. The systems utilize diffusely reflective surfaces, such that the active area exhibits a substantially Lambertian characteristic. A mask occludes a portion of the active area of the system, in the examples, the aperture of the cavity or the effective aperture formed by the cavity reflection, in such a manner as to achieve a desired response or output performance characteristic for the system. In examples of the present systems using constructive occlusion, the optical integrating cavity comprises a base, a mask and a cavity in either the base or the mask. The mask would have a diffusely reflective surface facing toward the aperture. The mask is sized and positioned relative to the active area so as to constructively occlude the active area. It may be helpful to consider two examples using constructive occlusion.

Figure 6:
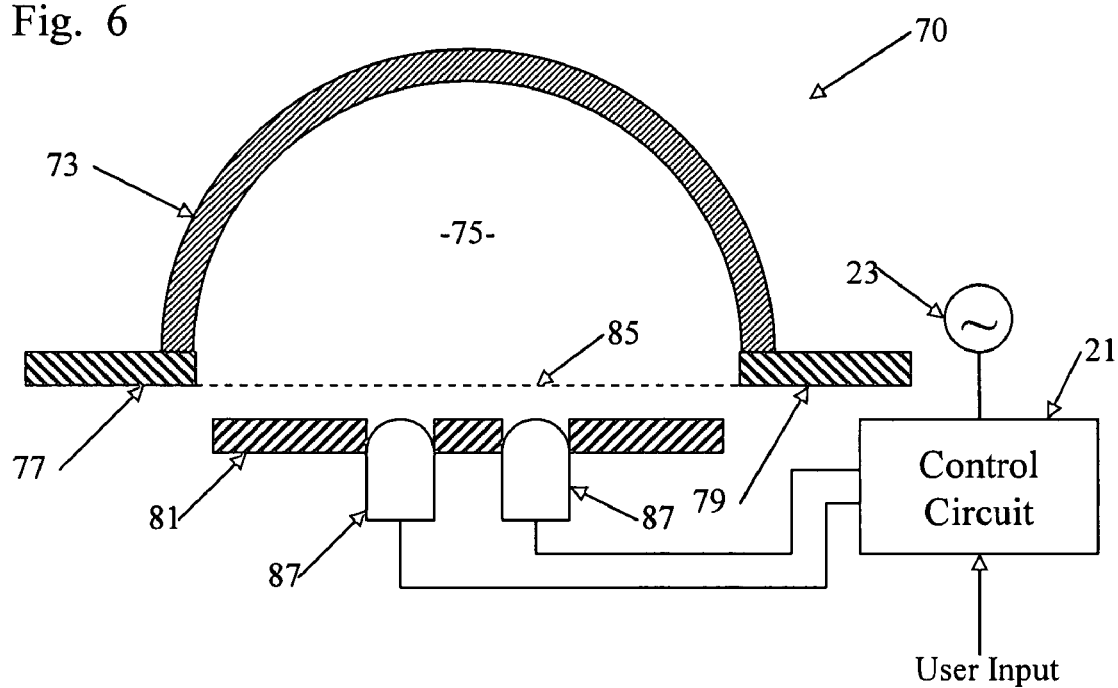
FIG. 6 illustrates another example of a radiant energy emitting system, utilizing principles of constructive occlusion.
Figure 7:
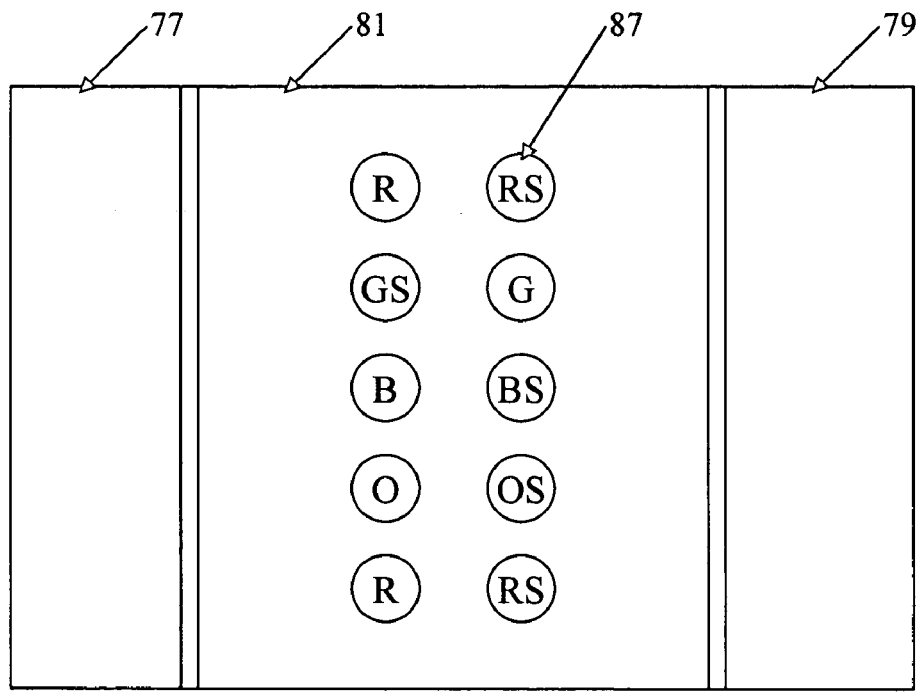
FIG. 7 is a bottom view of the fixture in the system of FIG. 6.

FIGS. 6 and 7 depict a first, simple embodiment of a light distributor apparatus or system 70, for projecting integrated multi-wavelength light with a tailored intensity distribution, using the principles of constructive occlusion. In the cross-section illustration, the system 70 is oriented to provide downward illumination. Such a system might be mounted in or suspended from a ceiling or canopy or the like. Those skilled in the art will recognize that the designer may choose to orient the system 70 in different directions, to adapt the system to other lighting applications.

The lighting system 70 includes a base 73, having or forming a cavity 75, and adjacent shoulders 77 and 79, constructed in a manner similar to the elements forming integrating cavities in the earlier examples. In particular, the interior of the cavity 75 is diffusely reflective, and the down-facing surfaces of shoulders 77 and 79 may be reflective. If the shoulder surfaces are reflective, they may be specular or diffusely reflective. A mask 81 is disposed between the cavity aperture 85 and the field to be illuminated. In this symmetrical embodiment, the interior wall of a half-cylindrical base 73 forms the cavity; therefore the aperture 85 is rectangular. The shoulders 77 formed along the sides of the aperture 85 are rectangular. If the base were circular, with a hemispherical cavity, the shoulders typically would form a ring that may partially or completely surround the aperture.

In many constructive occlusion embodiments, the cavity 75 comprises a substantial segment of a sphere. For example, the cavity may be substantially hemispherical, as in earlier examples. However, the cavity's shape is not of critical importance. A variety of other shapes may be used. In the illustrated example, the half-cylindrical cavity 75 has a rectangular aperture, and if extended longitudinally, the rectangular aperture may approach a nearly linear aperture (slit). Practically any cavity shape is effective, so long as it has a diffuse reflective inner surface. A hemisphere or the illustrated half-cylinder shape are preferred for the ease in modeling for the light output toward the field of intended illumination and the attendant ease of manufacture. Also, sharp corners tend to trap some reflected energy and reduce output efficiency.

For purposes of constructive occlusion, the base 73 may be considered to have an active optical area, preferably exhibiting a substantially Lambertian energy distribution. Where the cavity is formed in the base, for example, the planar aperture 85 formed by the rim or perimeter of the cavity 75 forms the active surface with substantially Lambertian distribution of energy emerging through the aperture. As shown in a later embodiment, the cavity may be formed in the facing surface of the mask. In such a system, the surface of the base may be a diffusely reflective surface, therefore the active area on the base would essentially be the mirror image of the cavity aperture on the base surface, that is to say the area reflecting energy emerging from the physical aperture of the cavity in the mask.

The mask 81 constructively occludes a portion of the optically active area of the base with respect to the field of intended illumination. In the example of FIG. 6, the optically active area is the aperture 85 of the cavity 75; therefore the mask 81 occludes a substantial portion of the aperture 85, including the portion of the aperture on and about the axis of the mask and cavity system. The surface of the mask 81 facing towards the aperture 85 is reflective. Although it may be specular, typically this surface is diffusely reflective.

The relative dimensions of the mask 81 and aperture 85, for example the relative widths (or diameters or radii in a more circular system) as well as the distance of the mask 81 away from the aperture 85, control the constructive occlusion performance characteristics of the lighting system 70. Certain combinations of these parameters produce a relatively uniform emission intensity with respect to angles of emission, over a wide portion of the field of view about the system axis (vertically downward in FIG. 6), covered principally by the constructive occlusion. Other combinations of size and height result in a system performance that is uniform with respect to a wide planar surface perpendicular to the system axis at a fixed distance from the active area.

The shoulders 77, 79 also are reflective and therefore deflect at least some light downward. The shoulders (and side surfaces of the mask) provide additional optical processing of combined light from the cavity. The angles of the shoulders and the reflectivity of the surfaces thereof facing toward the region to be illuminated by constructive occlusion also contribute to the intensity distribution over that region. In the illustrated example, the reflective shoulders are horizontal, although they may be angled somewhat downward from the plane of the aperture.

With respect to the energy of different wavelengths, the interior space formed between the cavity 75 and the facing surface of the mask 81 operates as an optical integrating cavity, in essentially the same manner as the integrating cavities in the previous embodiments. Again, the LEDs provide light of a number of different colors, and thus of different wavelengths. The optical cavity combines the light of multiple colors supplied from the LEDs 87. The control circuit 21 controls the amount of each color of light supplied to the chamber and thus the proportion thereof included in the combined output light. The constructive occlusion serves to distribute that light in a desired manner over a field or area that the system 70 is intended to illuminate, with a tailored intensity distribution.

The LEDs 87 could be located at (or coupled by optical fiber to emit light) from any location or part of the surface of the cavity 75. Preferably, the LED outputs are not directly visible through the un-occluded portions of the aperture 85 (between the mask and the edge of the cavity). In examples of the type shown in FIGS. 6 and 7, the easiest way to so position the LED outputs is to mount the LEDs 87 (or provide fibers or the like) so as to supply light to the chamber through openings through the mask 81.

FIG. 7 also provides an example of an arrangement of the LEDs in which there are both active and inactive (sleeper) LEDs of the various colors. As shown, the active part of the array of LEDs 87 includes two Red LEDs (R), one Green LED (G) and one Blue LED (B). The initially inactive part of the array of LEDs 87 includes two Red sleeper LEDs (RS), one Green sleeper LED (GS) and one Blue sleeper LED (BS). If other wavelengths or white light sources are desired, the apparatus may include an active LED of the other color (O) as well as a sleeper LED of the other color (OS). The precise number, type, arrangement and mounting technique of the LEDs and the associated ports through the mask 81 are not critical. The number of LEDs, for example, is chosen to provide a desired level of output energy (intensity), for a given application.

The system 70 includes a control circuit 21 and power source 23. These elements control the operation and output intensity of each LED 87. The individual intensities determine the amount of each color light included in the integrated and distributed output. The control circuit 21 functions in essentially the same manner as in the other examples.

Figure 9:
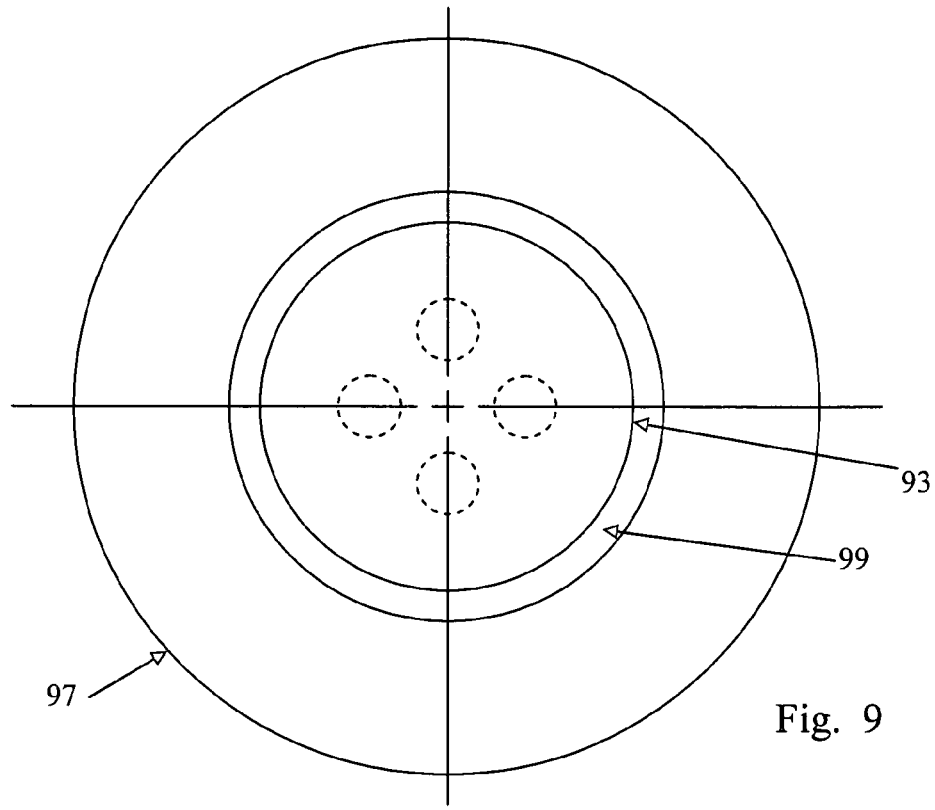
FIG. 9 is a top plan view of the fixture in the system of FIG. 8.
Figure 8:
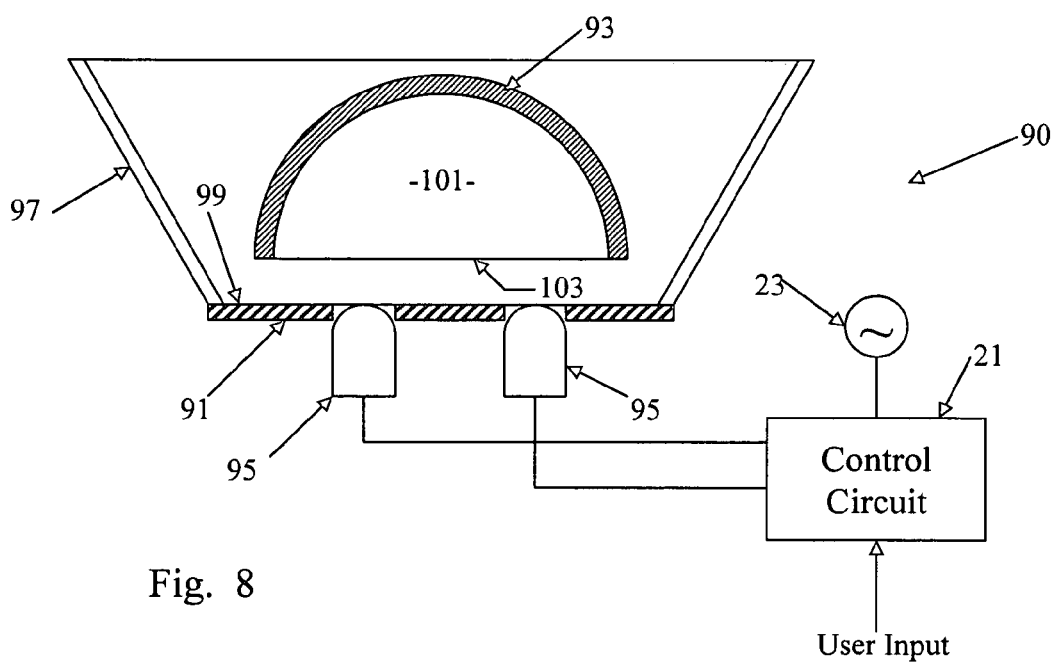
FIG. 8 illustrates an alternate example of a radiant energy emitting system, utilizing principles of constructive occlusion.

FIGS. 8 and 9 illustrate a second constructive occlusion example. In this example, the physical cavity is actually formed in the mask, and the active area of the base is a flat reflective panel of the base.

The illustrated system 90 comprises a flat base panel 91, a mask 93, LED light sources 95, and a conical deflector 97.

The system 90 is circularly symmetrical about a vertical axis, although it could be rectangular or have other shapes. The base 91 includes a flat central region 99 between the walls of the deflector 97. The region 99 is reflective and forms or contains the active optical area on the base facing toward the region or area to be illuminated by the system 90.

The mask 93 is positioned between the base 91 and the region to be illuminated by constructive occlusion. For example, in the orientation shown, the mask 93 is above the active optical area 99 of the base 91, for example to direct light toward a ceiling for indirect illumination. Of course, the mask and cavity system could be inverted to serve as a downlight for task lighting applications, or the mask and cavity system could be oriented to emit light in directions appropriate for other applications.

In this example, the mask 93 contains the diffusely reflective cavity 101, constructed in a manner similar to the integrating cavities in the earlier examples. The physical aperture 103 of the cavity 101 and of any diffusely reflective surface(s) of the mask 93 that may surround that aperture form an active optical area on the mask 93. Such an active area on the mask faces away from the region to be illuminated and toward the active surface 99 on the base 91. The surface 99 is reflective, preferably with a diffuse characteristic. The surface 99 of the base 91 essentially acts to produce a diffused mirror image of the mask 93 with its cavity 101 as projected onto the base area 99. The reflection formed by the active area of the base becomes the effective aperture of the optical integrating cavity (between the mask and base) when the fixture is considered from the perspective of the area of intended illumination. The surface area 99 reflects energy emerging from the aperture 103 of the cavity 101 in the mask 93. The mask 93 in turn constructively occludes light diffused from the active base surface 99 with respect to the region illuminated by the system 90. The dimensions and relative positions of the mask and active region on the base control the performance of the system, in essentially the same manner as in the mask and cavity system of FIGS. 6 and 7.

The system 90 includes a control circuit 21 and associated power source 23, for supplying controlled electrical power to the LED sources 95. In this example, the LEDs emit light through openings through the base 91, preferably at points not directly visible from outside the system. The LEDs 95 supply various wavelengths of light, and the circuit 21 controls the power of each LED, to control the amount of each color of light in the combined output, as discussed above relative to the other examples.

The base 91 could have a flat ring-shaped shoulder with a reflective surface. In this example, however, the shoulder is angled toward the desired field of illumination to form a conical deflector 97. The inner surface of the deflector 97 is reflective, as in the earlier examples.

The deflector 97 has the shape of a truncated cone, in this example, with a circular lateral cross section. The cone has two circular openings. The cone tapers from the large end opening to the narrow end opening, which is coupled to the active area 99 of the base 91. The narrow end of the deflector cone receives light from the surface 99 and thus from diffuse reflections between the base and the mask.

The entire area of the inner surface of the cone 97 is reflective. At least a portion of the reflective surface is specular, as in the deflectors of the earlier examples. The angle of the wall(s) of the conical deflector 97 substantially corresponds to the angle of the desired field of view of the illumination intended for the system 90. Because of the reflectivity of the wall of the cone 97, most if not all of the light reflected by the inner surface thereof would at least achieve an angle that keeps the light within the field of view.

The LED light sources 95 emit multiple wavelengths of light into the mask cavity 101. The light sources 95 may direct some light toward the inner surface of the deflector 97. Light rays impacting on the diffusely reflective surfaces, particularly those on the inner surface of the cavity 101 and the facing surface 99 of the base 91, reflect and diffuse one or more times within the confines of the system and emerge through the gap between the perimeter of the active area 99 of the base and the outer edge of the mask 93. The mask cavity 101 and the base surface 99 function as an optical integrating cavity with respect to the light of various wavelengths, and the gap becomes the actual integrating cavity aperture from which combined light emerges. The light emitted through the gap and/or reflected from the surface of the inner surface of the deflector 97 irradiates a region (upward in the illustrated orientation) with a desired intensity distribution and with a desired spectral characteristic, essentially as in the earlier examples.

Additional information regarding constructive occlusion based systems for generating and distributing radiant energy may be found in commonly assigned U.S. Pat. Nos. 6,342,695, 6,334,700, 6,286,979, 6,266,136 and 6,238,077. The color integration principles discussed herein may be adapted to any of the constructive occlusion devices discussed in those patents.

The inventive devices have numerous applications, and the output intensity and spectral characteristic may be tailored and/or adjusted to suit the particular application. For example, the intensity of the integrated radiant energy emitted through the aperture may be at a level for use in a rumination application or at a level sufficient for a task lighting application. A number of other control circuit features also may be implemented. For example, the control may maintain a set color characteristic in response to feedback from a color sensor. The control circuitry may also include a temperature sensor. In such an example, the logic circuitry is also responsive to the sensed temperature, e.g. to reduce intensity of the source outputs to compensate for temperature increases. The control circuitry may include an appropriate device for manually setting the desired spectral characteristic, for example, one or more variable resistors or one or more dip switches, to allow a user to define or select the desired color distribution.

Automatic controls also are envisioned. For example, the control circuitry may include a data interface coupled to the logic circuitry, for receiving data defining the desired color distribution. Such an interface would allow input of control data from a separate or even remote device, such as a personal computer, personal digital assistant or the like. A number of the devices, with such data interfaces, may be controlled from a common central location or device.

The control may be somewhat static, e.g. set the desired color reference index or desired color temperature and the overall intensity, and leave the device set-up in that manner for an indefinite period. The apparatus also may be controlled dynamically, for example, to provide special effects lighting. Where a number of the devices are arranged in a large two-dimensional array, dynamic control of color and intensity of each unit could even provide a video display capability, for example, for use as a "Jumbo Tron" view screen in a stadium or the like. In product lighting or in personnel lighting (for studio or theater work), the lighting can be adjusted for each product or person that is illuminated. Also, such light settings are easily recorded and reused at a later time or even at a different location using a different system.

To appreciate the features and examples of the control circuitry outlined above, it may be helpful to consider specific examples with reference to appropriate diagrams.

Figure 10:
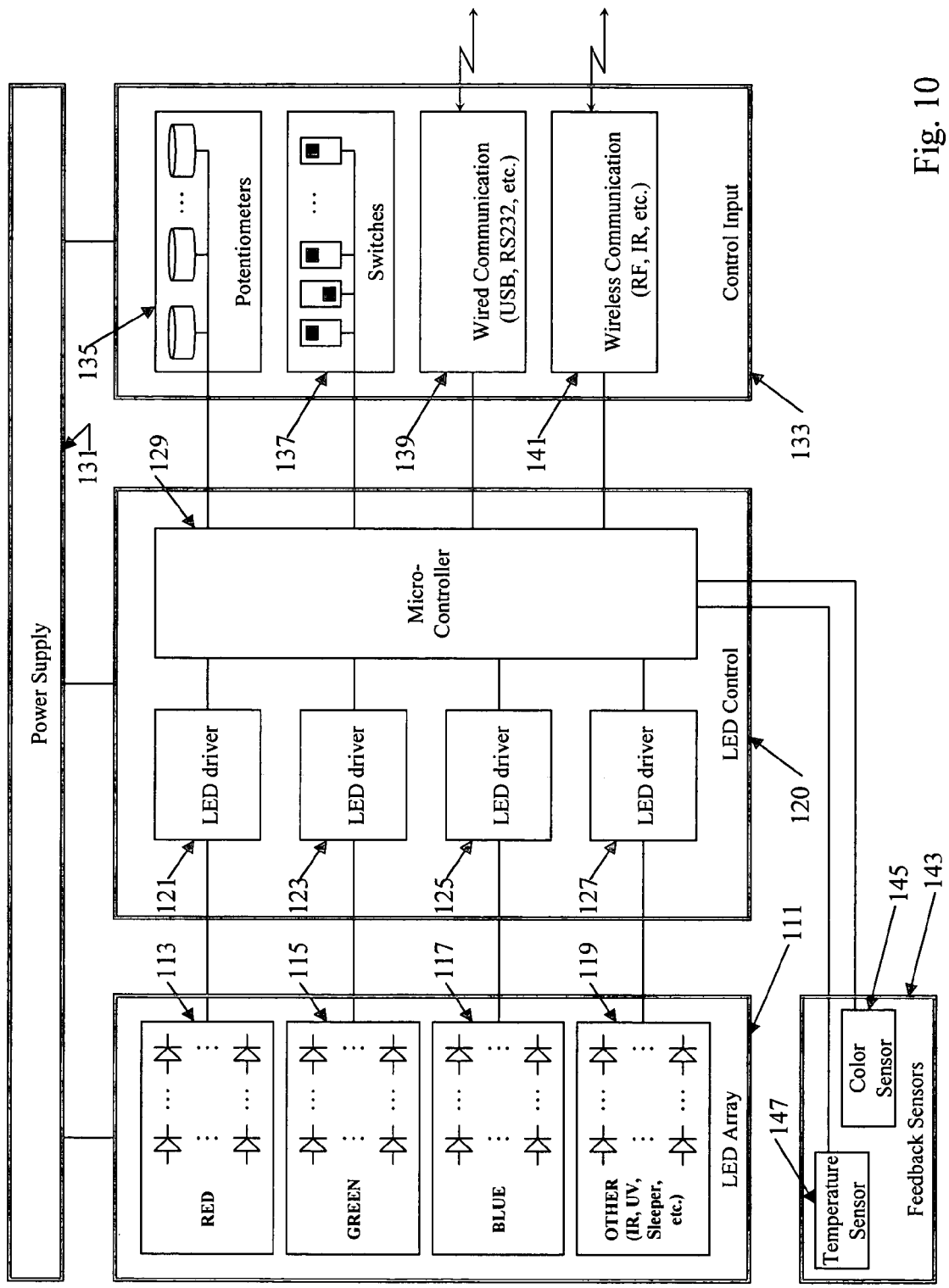
FIG. 10 is a functional block diagram of the electrical components, of one of the radiant energy emitting systems, using programmable digital control logic.

FIG. 10 is a block diagram of exemplary circuitry for the sources and associated control circuit, providing digital programmable control, which may be utilized with a light integrating fixture of the type described above. In this circuit example, the sources of radiant energy of the various types takes the form of an LED array 111. The array 111 comprises two or more LEDs of each of the three primary colors, red green and blue, represented by LED blocks 113, 115 and 117. For example, the array may comprise six red LEDs 113, three green LEDs 115 and three blue LEDs 117.

The LED array in this example also includes a number of additional or "other" LEDs 119. There are several types of additional LEDs that are of particular interest in the present discussion. One type of additional LED provides one or more additional wavelengths of radiant energy for integration within the chamber. The additional wavelengths may be in the visible portion of the light spectrum, to allow a greater degree of color adjustment. Alternatively, the additional wavelength LEDs may provide energy in one or more wavelengths outside the visible spectrum, for example, in the infrared range or the ultraviolet range.

The second type of additional LED that may be included in the system is a sleeper LED. As discussed above, some LEDs would be active, whereas the sleepers would be inactive, at least during initial operation. Using the circuitry of FIG. 10 as an example, the Red LEDs 113, Green LEDs 115 and Blue LEDs 117 might normally be active. The LEDs 119 would be sleeper LEDs, typically including one or more LEDs of each color used in the particular system.

The third type of other LED of interest is a white LED. For white lighting applications, one or more white LEDs provide increased intensity. The primary color LEDs then provide light for color adjustment and/or correction.

The electrical components shown in FIG. 10 also include an LED control system 120. The system 120 includes driver circuits for the various LEDs and a microcontroller. The driver circuits supply electrical current to the respective LEDs 113 to 119 to cause the LEDs to emit light. The driver circuit 121 drives the Red LEDs 113, the driver circuit 123 drives the green LEDs 115, and the driver circuit 125 drives the Blue LEDs 117. In a similar fashion, when active, the driver circuit 127 provides electrical current to the other LEDs 119. If the other LEDs provide another color of light, and are connected in series, there may be a single driver circuit 127. If the LEDs are sleepers, it may be desirable to provide a separate driver circuit 127 for each of the LEDs 119. The intensity of the emitted light of a given LED is proportional to the level of current supplied by the respective driver circuit.

The current output of each driver circuit is controlled by the higher level logic of the system. In this digital control example, that logic is implemented by a programmable microcontroller 129, although those skilled in the art will recognize that the logic could take other forms, such as discrete logic components, an application specific integrated circuit (ASIC), etc.

The LED driver circuits and the microcontroller 129 receive power from a power supply 131, which is connected to an appropriate power source (not separately shown). For most task-lighting applications, the power source will be an AC line current source, however, some applications may utilize DC power from a battery or the like. The power supply 129 converts the voltage and current from the source to the levels needed by the driver circuits 121–127 and the microcontroller 129.

A programmable microcontroller typically includes or has coupled thereto random-access memory (RAM) for storing data and read-only memory (ROM) and/or electrically erasable read only memory (EEROM) for storing control programming and any pre-defined operational parameters, such as pre-established light 'recipes.' The microcontroller 129 itself comprises registers and other components for implementing a central processing unit (CPU) and possibly an associated arithmetic logic unit. The CPU implements the program to process data in the desired manner and thereby generate desired control outputs.

The microcontroller 129 is programmed to control the LED driver circuits 121–127 to set the individual output intensities of the LEDs to desired levels, so that the combined light emitted from the aperture of the cavity has a desired spectral characteristic and a desired overall intensity. The microcontroller 129 may be programmed to essentially establish and maintain or preset a desired 'recipe' or mixture of the available wavelengths provided by the LEDs used in the particular system. The microcontroller 129 receives control inputs specifying the particular 'recipe' or mixture, as will be discussed below. To insure that the desired mixture is maintained, the microcontroller receives a color feedback signal from an appropriate color sensor. The microcontroller may also be responsive to a feedback signal from a temperature sensor, for example, in or near the optical integrating cavity.

The electrical system will also include one or more control inputs 133 for inputting information instructing the microcontroller 129 as to the desired operational settings. A number of different types of inputs may be used and several alternatives are illustrated for convenience. A given installation may include a selected one or more of the illustrated control input mechanisms.

As one example, user inputs may take the form of a number of potentiometers 135. The number would typically correspond to the number of different light wavelengths provided by the particular LED array 111. The potentiometers 135 typically connect through one or more analog to digital conversion interfaces provided by the microcontroller 129 (or in associated circuitry). To set the parameters for the integrated light output, the user adjusts the potentiometers 135 to set the intensity for each color. The microcontroller 129 senses the input settings and controls the LED driver circuits accordingly, to set corresponding intensity levels for the LEDs providing the light of the various wavelengths.

Another user input implementation might utilize one or more dip switches 137. For example, there might be a series of such switches to input a code corresponding to one of a number of recipes. The memory used by the microcontroller 129 would store the necessary intensity levels for the different color LEDs in the array 111 for each recipe. Based on the input code, the microcontroller 129 retrieves the appropriate recipe from memory. Then, the microcontroller 129 controls the LED driver circuits 121–127 accordingly, to set corresponding intensity levels for the LEDs 113–119 providing the light of the various wavelengths.

As an alternative or in addition to the user input in the form of potentiometers 135 or dip switches 137, the microcontroller 129 may be responsive to control data supplied from a separate source or a remote source. For that purpose, some versions of the system will include one or more communication interfaces. One example of a general class of such interfaces is a wired interface 139. One type of wired interface typically enables communications to and/or from a personal computer or the like, typically within the premises in which the fixture operates. Examples of such local wired interfaces include USB, RS-232, and wire-type local area network (LAN) interfaces. Other wired interfaces, such as appropriate modems, might enable cable or telephone line communications with a remote computer, typically outside the premises. Other examples of data interfaces provide wireless communications, as represented by the interface 141 in the drawing. Wireless interfaces, for example, use radio frequency (RF) or infrared (IR) links. The wireless communications may be local on-premises communications, analogous to a wireless local area network (WLAN). Alternatively, the wireless communications may enable communication with a remote device outside the premises, using wireless links to a wide area network.

As noted above, the electrical components may also include one or more feedback sensors 143, to provide system performance measurements as feedback signals to the control logic, implemented in this example by the microcontroller 129. A variety of different sensors may be used, alone or in combination, for different applications. In the illustrated examples, the set 143 of feedback sensors includes a color sensor 145 and a temperature sensor 147. Although not shown, other sensors, such as an overall intensity sensor may be used. The sensors are positioned in or around the system to measure the appropriate physical condition, e.g. temperature, color, intensity, etc.

The color sensor 145, for example, is coupled to detect color distribution in the integrated radiant energy. The color sensor may be coupled to sense energy within the optical integrating cavity, within the deflector (if provided) or at a point in the field illuminated by the particular system. Various examples of appropriate color sensors are known. For example, the color sensor may be a digital compatible sensor, of the type sold by TAOS, Inc. Another suitable sensor might use the quadrant light detector disclosed in U.S. Pat. No. 5,877,490, with appropriate color separation on the various light detector elements (see U.S. Pat. No. 5,914,487 for discussion of the color analysis).

The associated logic circuitry, responsive to the detected color distribution, controls the output intensity of the various LEDs, so as to provide a desired color distribution in the integrated radiant energy, in accord with appropriate settings. In an example using sleeper LEDs, the logic circuitry is responsive to the detected color distribution to selectively activate the inactive light emitting diodes as needed, to maintain the desired color distribution in the integrated radiant energy. The color sensor measures the color of the integrated radiant energy produced by the system and provides a color measurement signal to the microcontroller 129. If using the TAOS, Inc. color sensor, for example, the signal is a digital signal derived from a color to frequency conversion.

The temperature sensor 147 may be a simple thermoelectric transducer with an associated analog to digital converter, or a variety of other temperature detectors may be used. The temperature sensor is positioned on or inside of the fixture, typically at a point that is near the LEDs or other sources that produce most of the system heat. The temperature sensor 147 provides a signal representing the measured temperature to the microcontroller 129. The system logic, here implemented by the microcontroller 129, can adjust intensity of one or more of the LEDs in response to the sensed temperature, e.g. to reduce intensity of the source outputs to compensate for temperature increases. The program of the microcontroller 129, however, would typically manipulate the intensities of the various LEDs so as to maintain the desired color balance between the various wavelengths of light used in the system, even though it may vary the overall intensity with temperature. For example, if temperature is increasing due to increased drive current to the active LEDs (with increased age or heat), the controller may deactivate one or more of those LEDs and activate a corresponding number of the sleepers, since the newly activated sleeper(s) will provide similar output in response to lower current and thus produce less heat.

Figure 11:
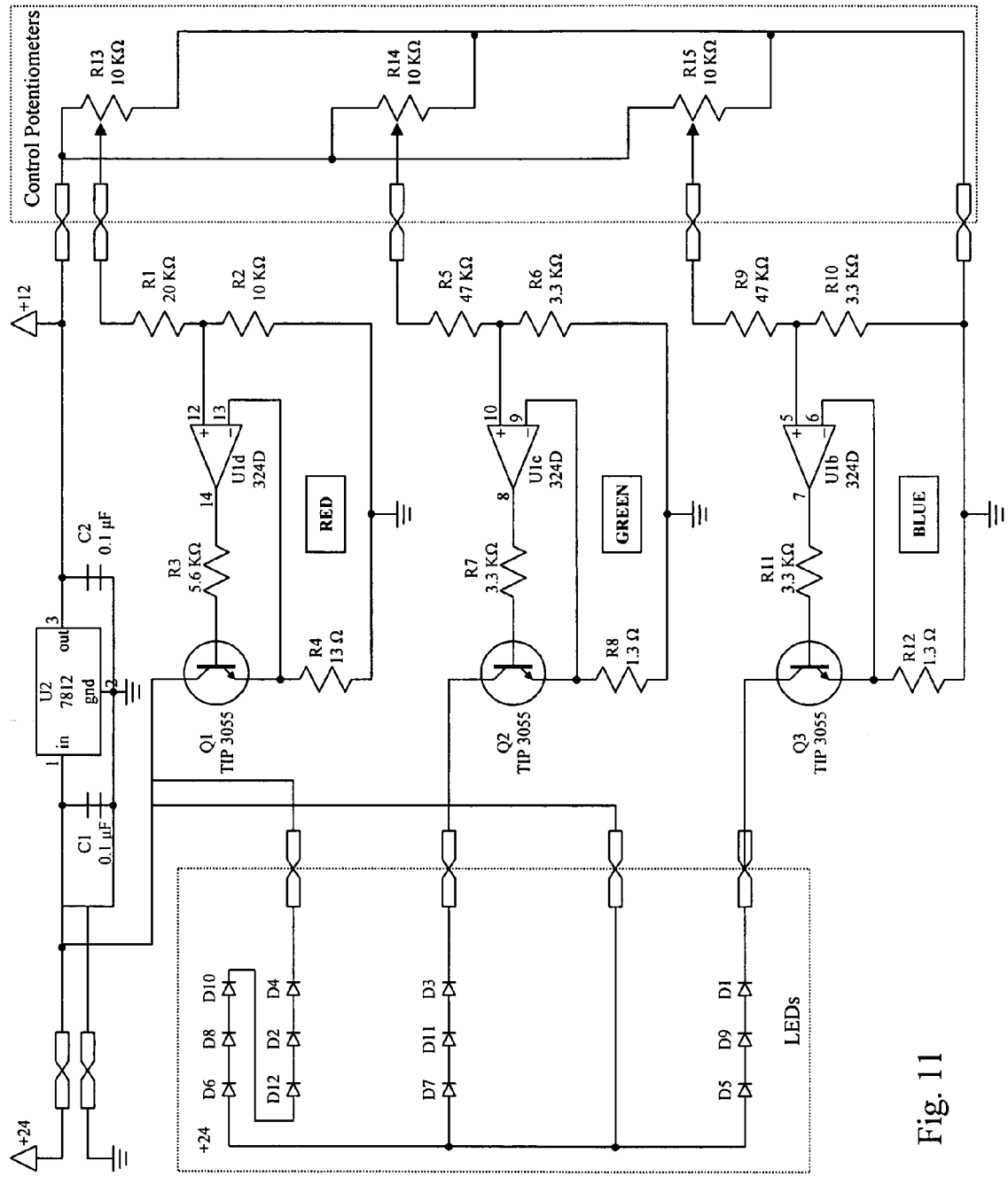
FIG. 11 is a circuit diagram showing the electrical components, of one of the radiant energy emitting systems, using analog control circuitry.

The above discussion of FIG. 10 related to programmed digital implementations of the control logic. Those skilled in the art will recognize that the control also may be implemented using analog circuitry. FIG. 11 is a circuit diagram of a simple analog control for a lighting apparatus (e.g. of the type shown in FIG. 1) using Red, Green and Blue LEDs. The user establishes the levels of intensity for each type of radiant energy emission (Red, Green or Blue) by operating a corresponding one of the potentiometers. The circuitry essentially comprises driver circuits for supplying adjustable power to two or three sets of LEDs (Red, Green and Blue) and analog logic circuitry for adjusting the output of each driver circuit in accord with the setting of a corresponding potentiometer. Additional potentiometers and associated circuits would be provided for additional colors of LEDs. Those skilled in the art should be able to implement the illustrated analog driver and control logic of FIG. 11 without further discussion.

The systems described above have a wide range of applications, where there is a desire to set or adjust color provided by a lighting fixture. These include task lighting applications, signal light applications, as wells as applications for illuminating an object or person. Some lighting applications involve a common overall control strategy for a number of the systems. As noted in the discussion of FIG. 10, the control circuitry may include a communication interface 139 or 141 allowing the microcontroller 129 to communicate with another processing system. FIG. 12 illustrates an example in which control circuits 21 of a number of the radiant energy generation systems with the light integrating and distribution type fixture communicate with a master control unit 151 via a communication network 153. The master control unit 151 typically is a programmable computer with an appropriate user interface, such as a personal computer or the like. The communication network 153 may be a LAN or a wide area network, of any desired type. The communications allow an operator to control the color and output intensity of all of the linked systems, for example to provide combined lighting effects.

The commonly controlled lighting systems may be arranged in a variety of different ways, depending on the intended use of the systems. FIG. 13 for example, shows a somewhat random arrangement of lighting systems. The circles represent the output openings of those systems, such as the large opening of the system deflectors. The dotted lines represent the fields of the emitted radiant energy. Such an arrangement of lighting systems might be used to throw desired lighting on a wall or other object and may allow the user to produce special lighting effects at different times. Another application might involve providing different color lighting for different speakers during a television program, for example, on a news program, panel discussion or talk show.

The commonly controlled radiant energy emission systems also may be arranged in a two-dimensional array or matrix. FIG. 14 shows an example of such an array. Again, circles represent the output openings of those systems. In this example of an array, the outputs are tightly packed. Each output may serve as a color pixel of a large display system. Dynamic control of the outputs therefore can provide a video display screen, of the type used as jumbo-trons in stadiums or the like.

In the examples above, a deflector, mask or shoulder was used to provide further optical processing of the integrated light emerging from the aperture of the fixture. A variety of other optical processing devices may be used in place of or in combination with any of those optical processing elements. Examples include various types of diffusers, collimators, variable focus mechanisms, and iris or aperture size control mechanisms. Several of these examples are shown in FIGS. 15–16.

Figure 15A:
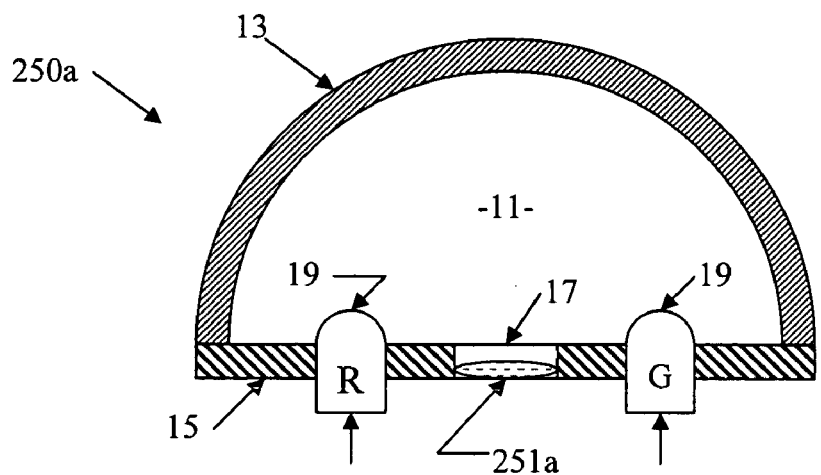
FIGS. 15A to 15C are cross-sectional views of additional examples, of optical cavity LED light fixtures, with several alternative elements for processing of the combined light emerging from the cavity.
Figure 15B:
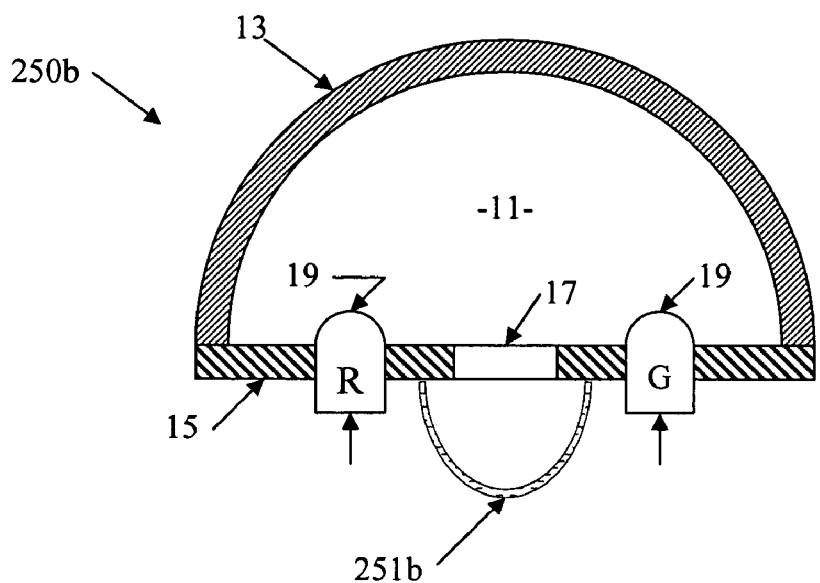
Figure 15C:
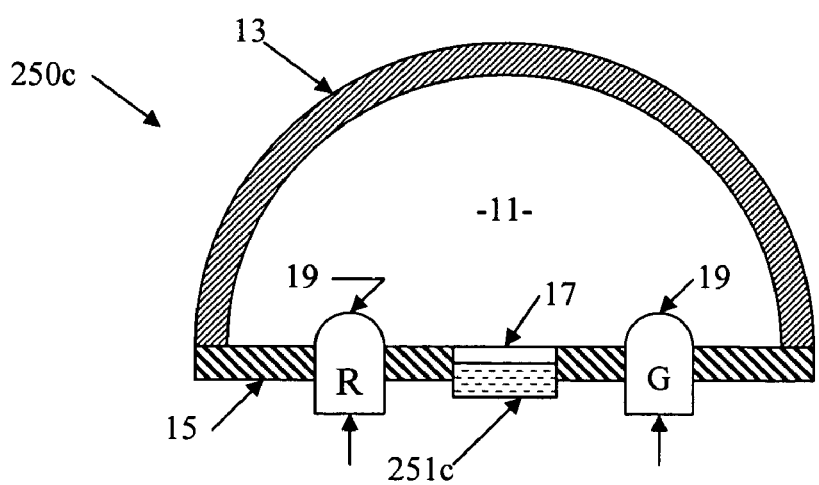
Figure 16:
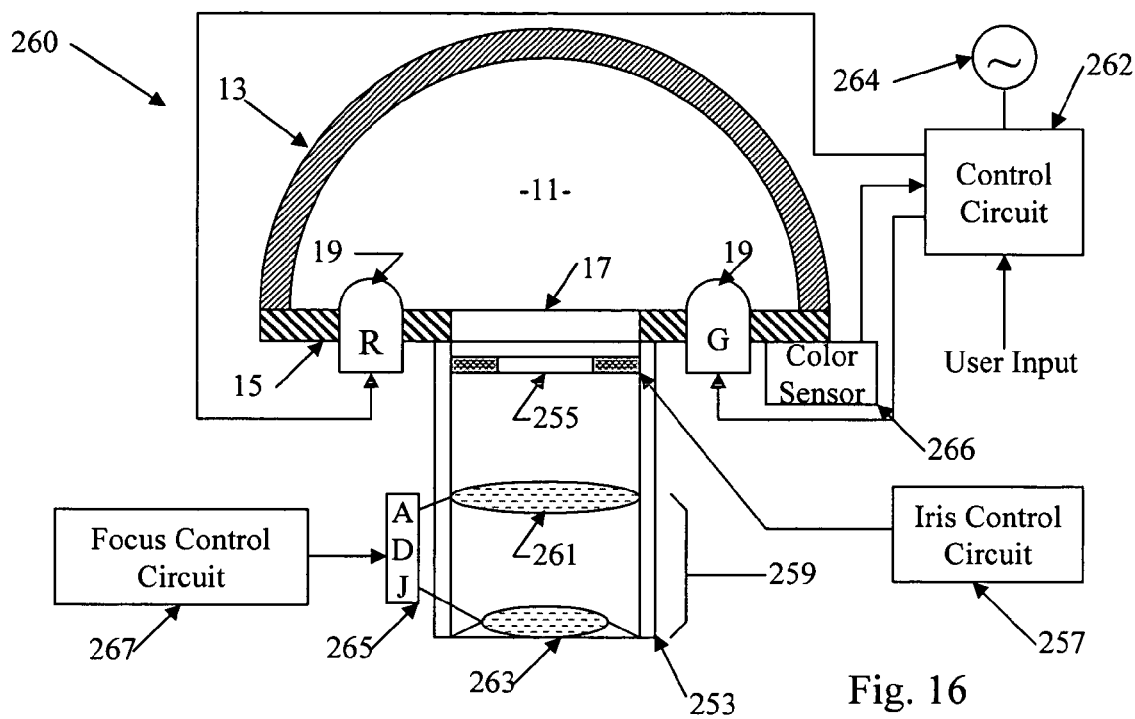
FIG. 16 is a cross-sectional view of another example of an optical cavity LED light fixture, using a collimator, iris and adjustable focusing system to process the combined light output.

FIGS. 15A to 15C are cross-sectional views of several examples of optical cavity LED fixtures using various forms of secondary optical processing elements to process the integrated energy emitted through the aperture. Although similar fixtures may process and emit other radiant energy spectra, for discussion here we will assume these "lighting" fixtures process and emit light in the visible part of the spectrum. These first three examples are similar to each other, and the common aspects are described first. Each fixture 250 (250a to 250c in FIGS. 15A to 15C, respectively) includes an optical integrating cavity and LEDs similar to those in the example of FIG. 1 and like reference numerals are used to identify the corresponding components. A power source and control circuit similar to those used in the earlier examples provide the drive currents for the LEDs, and in view of the similarity, the power source and control circuit are omitted from these figures, to simplify the illustrations.

In the examples of FIGS. 15a to 15C, each light fixture 250a to 250c includes an optical integrating cavity 11, formed by a dome 11 and a cover plate 15. The surfaces of the dome 13 and cover 15 forming the interior surface(s) of the cavity 11 are diffusely reflective. One or more apertures 17, in these examples formed through the plate 15, provide a light passage for transmission of reflected and integrated light outward from the cavity 11. Materials, positions, orientations and possible shapes for the elements 11 to 17 have been discussed above.

As in the earlier examples, each fixture 250a to 250c includes a number of LEDs 19 emitting light of different wavelengths into the cavity 11, as in the example of FIG. 1. A number of the LEDs will be active, from initial start-up, whereas others may initially be inactive 'sleepers,' as also discussed above. The possible combinations and positions of the LEDs 19 have been discussed in detail above, in relation to the earlier examples. Again, the LEDs 19 emit light of multiple colors into the interior of the optical integrating cavity. Control of the amplitudes of the drive currents applied to the LEDs 19 controls the amount of each light color supplied into the cavity 11. The cavity 11 integrates the various amounts of light of the different colors into a combined light for emission through the aperture 17.

The three examples (FIGS. 15A to 15C) differ as to the processing element coupled to the aperture that processes the integrated color light output coming out of the aperture 17. In the example of FIG. 15A, instead of a deflector as in FIG. 1, the fixture 250a includes a lens 251a in or covering the aperture 17. The lens may take any convenient form, for focusing or diffusing the emitted combined light, as desired for a particular application of the fixture 250a. The lens 251a may be clear or translucent.

In the example of FIG. 15B, the fixture 250b includes a curved transmissive diffuser 251a covering the aperture 17. The diffuser may take any convenient form, for example, a white or clear dome of plastic or glass. Alternatively, the dome may be formed of a prismatic material. In addition to covering the aperture, the element 251b diffuses the emitted combined light, as desired for a particular application of the fixture 250b. The dome shaped diffuser may cover just the aperture, as shown at 251b, or it may cover the backs of the LEDs 19 as well.

In the example of FIG. 15C, a holographic diffraction plate or grading 251c serves as the optical output processing element in the fixture 250c. The holographic grating is another form of diffuser. The holographic diffuser 251c is located in the aperture 17 or attached to the plate 15 to cover the aperture 17. A holographic diffuser provides more precise control over the diffuse area of illumination and increases transmission efficiency. Holographic diffusers and/or holographic films are available from a number of manufacturers, including Edmund Industrial Optics of Barrington, N.J.

Those skilled in the art will recognize that still other light processing elements may be used in place of the output lens 251a, the diffuser 251b and the holographic diffuser 251c, to process or guide the integrated light output. For example, a fiber optic bundle may be used to channel the light to a desired point, for example representing a pixel on a large display screen (e.g. a jumbo tron).

The exemplary systems discussed herein may have any size desirable for any particular application. A system may be relatively large, for lighting a room or providing spot or flood lighting. The system also may be relatively small, for example, to provide a small pinpoint of light, for an indicator or the like. The system 250a, with or even without the lens, is particularly amenable to miniaturization. For example, instead of a plate to support the LEDs, the LEDs could be manufactured on a single chip. If it was not convenient to provide the aperture through the chip, the aperture could be formed through the reflective dome.

FIG. 16 illustrates another example of a "lighting" system 260 with an optical integrating cavity LED light fixture, having yet other elements to optically process the combined color light output. The system 260 includes an optical integrating cavity and LEDs similar to those in the examples of FIGS. 1 and 15, and like reference numerals are used to identify the corresponding components.

In the example of FIG. 16, the light fixture includes an optical integrating cavity 11, formed by a dome 11 and a cover plate 15. The surfaces of the dome 13 and cover 15 forming the interior surface(s) of the cavity 11 are diffusely reflective. One or more apertures 17, in this example formed through the plate 15, provide a light passage for transmission of reflected and integrated light outward from the cavity 11. Materials, possible shapes, positions and orientations for the elements 11 to 17 have been discussed above. As in the earlier examples, the system 260 includes a number of LEDs 19 emitting light of different wavelengths into the cavity 11. The possible combinations and positions of the LEDs 19 have been discussed in detail above, in relation to the earlier examples.

The LEDs 19 emit light of multiple colors into the interior of the optical integrating cavity 11. In this example, the light colors are in the visible portion of the radiant energy spectrum. Control of the amplitudes of the drive currents applied to the LEDs 19 controls the amount of each light color supplied into the cavity 11. A number of the LEDs will be active, from initial start-up, whereas others may initially be inactive 'sleepers,' as discussed above. The cavity 11 integrates the various amounts of light of the different colors into a combined light of a desired color temperature for emission through the aperture 17.

The system 260 also includes a control circuit 262 coupled to the LEDs 19 for establishing output intensity of radiant energy of each of the LED sources. The control circuit 262 typically includes a power supply circuit coupled to a source, shown as an AC power source 264, although the power source 264 may be a DC power source. In either case, the circuit 262 may be adapted to process the voltage from the available source to produce the drive currents necessary for the LEDs 19. The control circuit 262 includes an appropriate number of LED driver circuits, as discussed above relative to FIGS. 10 and 11, for controlling the power applied to each of the individual LEDs 19 and thus the intensity of radiant energy supplied to the cavity 11 for each different type/color of light. Control of the intensity of emission of each of the LED sources sets a spectral characteristic of the combined radiant energy emitted through the aperture 17 of the optical integrating cavity 11, in this case, the color characteristic(s) of the visible light output.

The control circuit 262 may respond to a number of different control input signals, for example, to one or more user inputs as shown by the arrow in FIG. 16. Feedback may also be provided by a temperature sensor (not shown in this example) or one or more color sensors 266. The color sensor(s) 266 may be located in the cavity or in the element or elements for processing light emitted through the aperture 17. However, in many cases, the plate 15 and/or dome 13 may pass some of the integrated light from the cavity, in which case, it is actually sufficient to place the color light sensor(s) 266 adjacent any such transmissive point on the outer wall that forms the cavity. In the example, the sensor 266 is shown attached to the plate 15. Details of the control feedback have been discussed earlier, with regard to the circuitry in FIG. 10.

The example of FIG. 16 utilizes a different arrangement for directing and processing the light after emission from the cavity 11 through the aperture 17. This system 260 utilizes a collimator 253, an adjustable iris 255 and an adjustable focus lens system 259.

The collimator 253 may have a variety of different shapes, depending on the desired application and the attendant shape of the aperture 17. For ease of discussion here, it is assumed that the elements shown are circular, including the aperture 17. Hence, in the example, the collimator 253 comprises a substantially cylindrical tube, having a circular opening at a proximal end coupled to the aperture 17 of the optical integrating cavity 11. The system 260 emits light toward a desired field of illumination via the circular opening at the distal end of the collimator 253.

The interior surface of the collimator 253 is reflective. The reflective inner surface may be diffusely reflective or quasi-specular. Typically, in this embodiment, the interior surface of the deflector/collimator element 253 is specular. The tube forming the collimator 253 also supports a series of elements for optically processing the collimated and integrated light. Those skilled in the art will be familiar with the types of processing elements that may be used, but for purposes of understanding, it may be helpful to consider two specific types of such elements.

First, the tube forming the collimator 253 supports a variable iris. The iris 257 represents a secondary aperture, which effectively limits the output opening and thus the intensity of light that may be output by the system 260. Although shown in the collimator tube, the iris may be mounted in or serve as the aperture 17. A circuit 257 controls the size or adjustment of the opening of the iris 255. In practice, the user activates the LED control circuit (see e.g. 21 in FIG. 1) to set the color balance or temperature of the output light, that is to say, so that the system 260 outputs light of a desired color. The overall intensity of the output light is then controlled through the circuit 257 and the iris 255. Opening the iris 255 wider provides higher output intensity, whereas reducing the iris opening size decreases intensity of the light output.

In the system 260, the tube forming the collimator 253 also supports one or more lens elements of the adjustable focusing system 259, shown by way of example as two lenses 261 and 263. Spacing between the lenses and/or other parameters of the lens system 259 are adjusted by a mechanism 265, in response to a signal from a focus control circuit 267. The elements 261 to 267 of the system 259 are shown here by way of example, to represent a broad class of elements that may be used to variably focus the emitted light in response to a control signal or digital control information or the like. If the system 260 serves as a spot light, adjustment of the lens system 259 effectively controls the size of the spot on the target object or subject that the system illuminates. Those skilled in the art will recognize that other optical processing elements may be provided, such as a mask to control the shape of the illumination spot or various shutter arrangements for beam shaping.

Although shown as separate control circuits 257 and 267, the functions of these circuits may be integrated together with each other or integrated into the circuit 262 that controls the operation of the LEDs 19. For example, the system might use a single microprocessor or similar programmable microcontroller, which would run control programs for the LED drive currents, the iris control and the focus control.

The optical integrating cavity 11 and the LEDs 19 produce light of a precisely controlled composite color. As noted, control of the LED currents controls the amount of each color of light integrated into the output and thus the output light color. Control of the opening provided by the iris 255 then controls the intensity of the integrated light output of the system 260. Control of the focusing by the system 259 enables control of the breadth of the light emissions and thus the spread of the area or region to be illuminated by the system 260. Other elements may be provided to control beam shape. Professional production lighting applications for such a system include theater or studio lighting, for example, where it is desirable to control the color, intensity and the size of a spotlight beam. By connecting the LED control circuit 257, the iris control circuit 257 and the focus control circuit 267 to a network similar to that in FIG. 12, it becomes possible to control color, intensity and spot size from a remote network terminal, for example, at an engineer's station in the studio or theater.

The discussion of the examples above has mainly referenced illuminance type lighting applications, for example to illuminate rooms or provide spot lighting in a theater or studio. Only brief mention has been given so far, of other applications. Those skilled in the art will recognize, however, that the principles discussed herein may also find wide use in other applications, particularly in luminance applications, such as various kinds of signal lighting.

Figure 17:
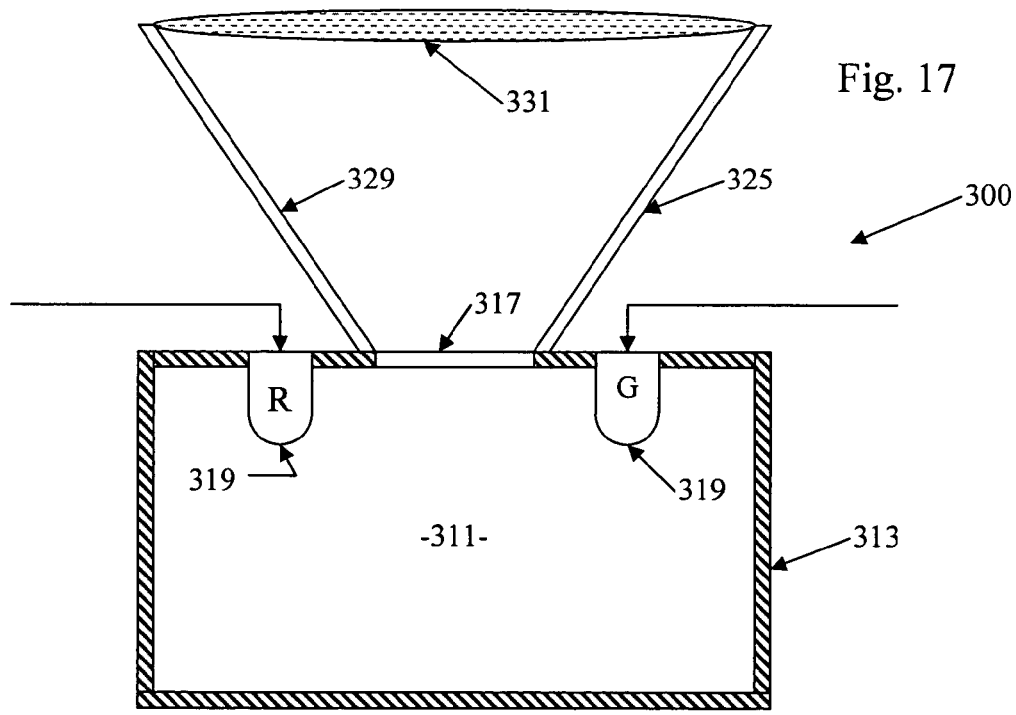
FIG. 17 is a cross-sectional view of another example of an optical cavity LED light fixture.
Figure 18:
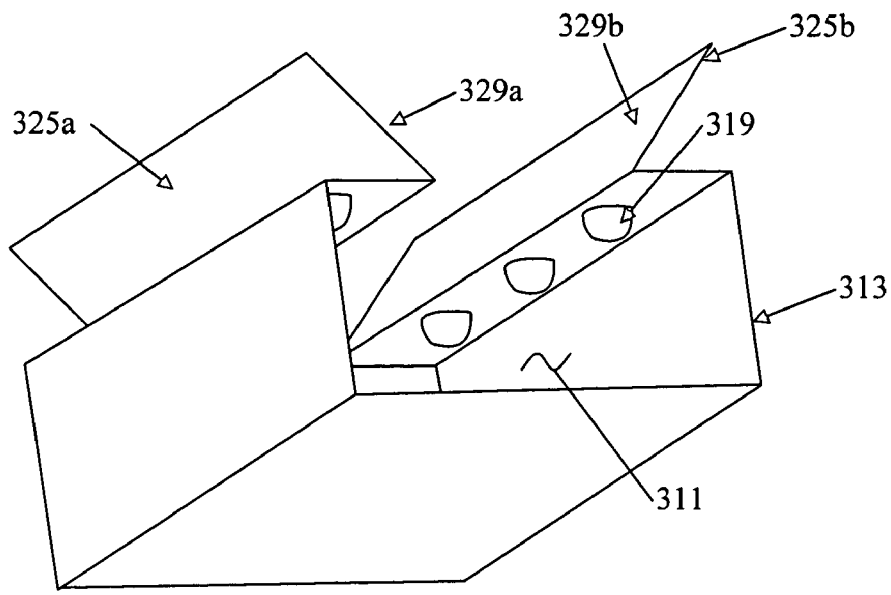
FIG. 18 is an isometric view of an extruded section of a fixture having the cross-section of FIG. 17.
Figure 19:
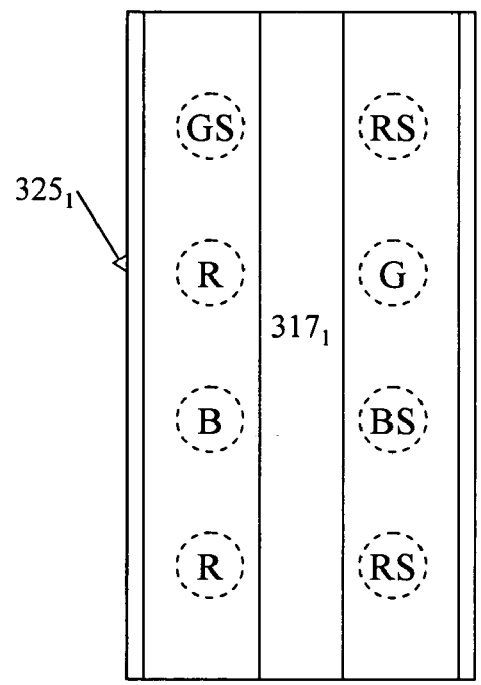
FIG. 19 is a front view of a fixture for use in a luminance application, for example to represent the letter "I."
Figure 20:
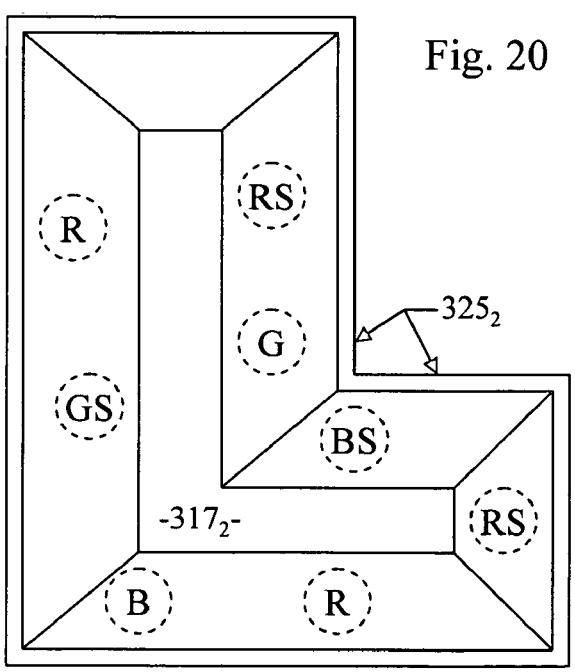
FIG. 20 is a front view of a fixture for use in a luminance application, representing the letter "L."

FIG. 17 is a cross-sectional view of another example of an optical cavity LED type fixture. Although this design may be used for illumination, for purposes of discussion here, we will concentrate on application for luminance purposes. The fixture 300 includes an optical cavity 311 having a diffusely reflective inner surface, as in the earlier examples. In this fixture, the cavity 311 has a substantially rectangular cross-section. FIG. 18 is an isometric view of a portion of a fixture having the cross-section of FIG. 17, showing several of the components formed as a single extrusion of the desired cross section. FIGS. 19 and 20 then show use of such a fixture arranged so as to construct lighted letters.

The fixture 300 preferably includes several initially-active LEDs and several sleeper LEDs, generally shown at 319, similar to those in the earlier examples. The LEDs emit controlled amounts of multiple colors of light into the optical integrating cavity 311 formed by the inner surfaces of a rectangular member 313. A power source and control circuit similar to those used in the earlier examples provide the drive currents for the LEDs 319, and in view of the similarity, the power source and control circuit are omitted from FIG. 17, to simplify the illustration. One or more apertures 317, of the shape desired to facilitate the particular luminance application, provide light passage for transmission of reflected and integrated light outward from the cavity 311. Materials for construction of the cavity and the types of LEDs that may be used are similar to those discussed relative to the earlier illumination examples, although the number and intensities of the LEDs may be different, to achieve the output parameters desired for the particular luminance application.

The fixture 300 in this example (FIG. 17) includes a deflector 325 to further process and direct the light emitted from the aperture 317 of the optical integrating cavity 311. The deflector 325 has a reflective interior surface 329 and expands outward laterally from the aperture, as it extends away from the cavity toward the region to be illuminated. In a circular implementation, the deflector 325 would be conical. However, in the example of FIG. 18, the deflector is formed by two opposing panels 325a and 325b of the extruded body. The surfaces 329a and 329b of the panels are reflective. As in the earlier examples, all or portions of the deflector surfaces may be diffusely reflective, quasi-specular or specular. For some examples, it may be desirable to have one panel surface 329a diffusely reflective and have specular reflectivity on the other panel surface 329b.

As shown in FIG. 17, a small opening at a proximal end of the deflector 325 is coupled to the aperture 317 of the optical integrating cavity 311. The deflector 325 has a larger opening at a distal end thereof. The angle of the interior surface 329 and size of the distal opening of the deflector 325 define an angular field of radiant energy emission from the apparatus 300. The large opening of the deflector 325 is covered with a grating, a plate or the exemplary lens 331 (which is omitted from FIG. 18, for convenience). The lens 331 may be clear or translucent to provide a diffuse transmissive processing of the light passing out of the large opening. Prismatic materials, such as a sheet of microprism plastic or glass also may be used.

The overall shape of the fixture 300 may be chosen to provide a desired luminous shape, for example, in the shape of any selected number, character, letter, or other symbol. FIG. 19, for example, shows a view of such a fixture, as if looking back from the area receiving the light, with the lens removed from the output opening of the deflector. In this example, the aperture $317_1$ and the output opening of the deflector $325_1$ are both rectangular, although they may have somewhat rounded corners. Alternatively, the deflector may be somewhat oval in shape. To the observer, the fixture will appear as a tall rectangular light. If the long dimension of the rectangular shape is extended or elongated sufficiently, the lighted fixture might appear as a lighted letter I. The shapes of the cavity and the aperture may vary, for example, to have rounded ends, and the deflector may be contoured to match the aperture, for example, to provide softer or sharper edges and/or to create a desired font style for the letter.

FIG. 20 shows a view of another example such a fixture, again as if looking back from the area receiving the light with the lens removed from the output opening of the deflector. In this example, the aperture $317_2$ and the output opening of the deflector $325_2$ are both L-shaped. When lighted, the observer will perceive the fixture as a lighted letter L. Of course, the shapes of the aperture and deflector openings may vary somewhat, for example, by using curves or rounded corners, so the letter approximates the shape for a different type font.

The extruded body construction illustrated in FIG. 18 may be curved or bent for use in different letters. By combining several versions of the fixture 300, shaped to represent different letters, it becomes possible to spell out words and phrases. Control of the amplitudes of the drive currents applied to the LEDs 319 of each fixture controls the amount of each light color supplied into the respective optical integrating cavity and thus the combined light output color of each number, character, letter, or other symbol.

Figure 21:
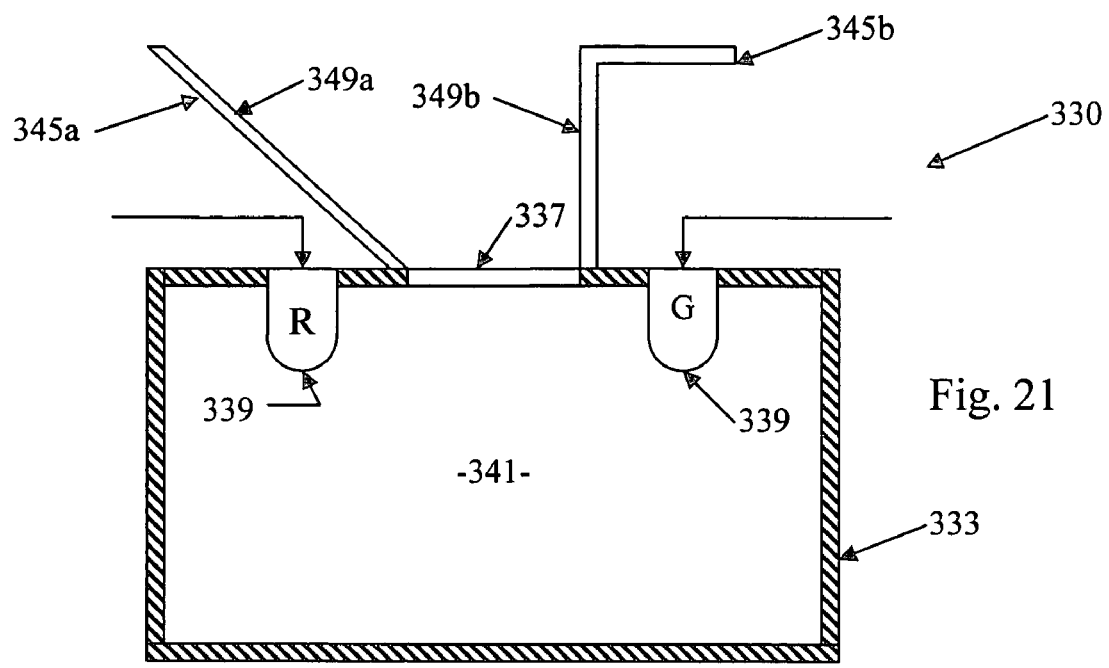
FIG. 21 is a cross-sectional view of another example of an optical cavity LED light fixture, as might be used for a "wall-washer" application.
Figure 22:
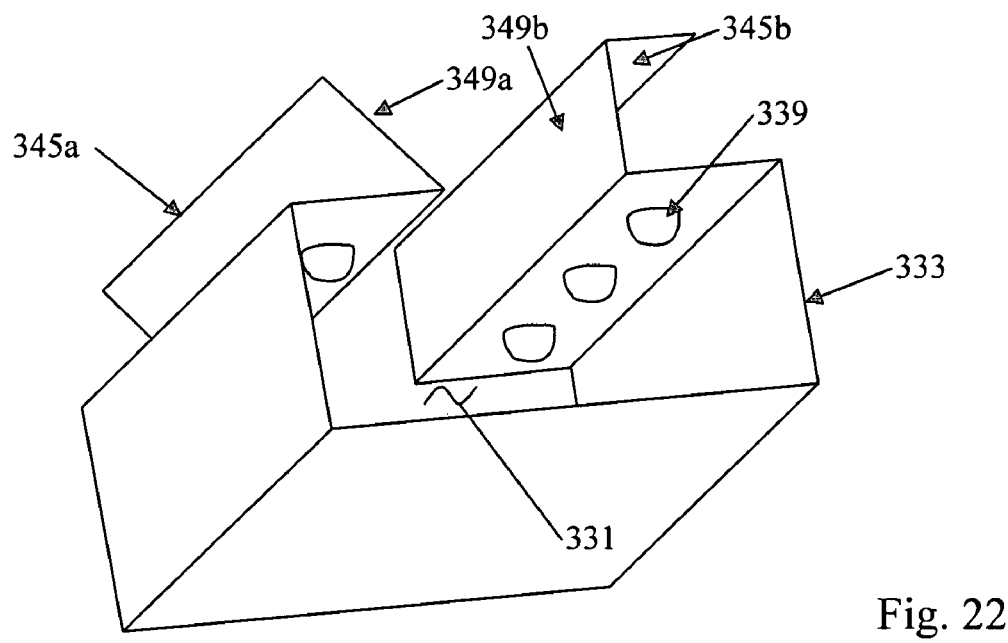
FIG. 22 is an isometric view of an extruded section of a fixture having the cross-section of FIG. 21.

FIGS. 21 and 22 show another fixture, but here adapted for use as a "wall-washer" illuminant lighting fixture. The fixture 330 includes an optical integrating cavity 331 having a diffusely reflective inner surface, as in the earlier examples. In this fixture, the cavity 331 again has a substantially rectangular cross-section. FIG. 22 is an isometric view of a section of the fixture, showing several of the components formed as a single extrusion of the desired cross section, but without any end-caps.

As shown in these figures, the fixture 330 includes several initially-active LEDs and several sleeper LEDs, generally shown at 339, similar to those in the earlier examples. The LEDs emit controlled amounts of multiple colors of light into the optical integrating cavity 341 formed by the inner surfaces of a rectangular member 333. A power source and control circuit similar to those used in the earlier examples provide the drive currents for the LEDs 339, and in view of the similarity, the power source and control circuit are omitted from FIG. 21, to simplify the illustration. One or more apertures 337, of the shape desired to facilitate the particular lighting application, provide light passage for transmission of reflected and integrated light outward from the cavity 341. Materials for construction of the cavity and the types of LEDs that may be used are similar to those discussed relative to the earlier illumination examples, although the number and intensities of the LEDs may be different, to achieve the output parameters desired for the particular wall-washer application.

The fixture 330 in this example (FIG. 21) includes a deflector to further process and direct the light emitted from the aperture 337 of the optical integrating cavity 341, in this case toward a wall, product or other subject somewhat to the left of and above the fixture 330. The deflector is formed by two opposing panels 345a and 345b of the extruded body of the fixture. The panel 345a is relatively flat and angled somewhat to the left, in the illustrated orientation. Assuming a vertical orientation of the fixture as shown in FIG. 21, the panel 345b extends vertically upward from the edge of the aperture 337 and is bent back at about 90°. The shapes and angles of the panels 345a and 345b are chosen to direct the light to a particular area of a wall or product display that is to be illuminated, and may vary from application to application.

Each panel 345a, 345b has a reflective interior surface 349a, 349b. As in the earlier examples, all or portions of the deflector surfaces may be diffusely reflective, quasi-specular or specular. In the wall washer example, the deflector panel surface 349b is diffusely reflective, and the deflector panel surface 349a has a specular reflectivity, to optimize distribution of emitted light over the desired area illuminated by the fixture 330.

The output opening of the deflector 345 may be covered with a grating, a plate or lens, in a manner similar to the example of FIG. 17, although in the illustrated wall washer example, such an element is omitted.

Figure 23:
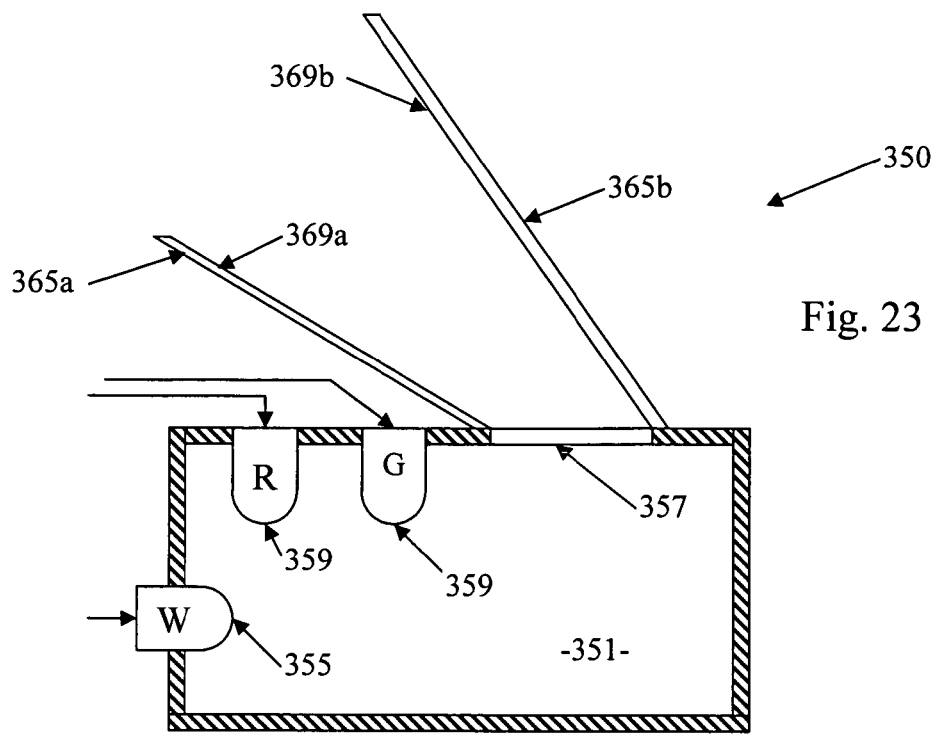
FIG. 23 is a cross-sectional view of another example of an optical cavity LED light fixture, as might be used for a "wall-washer" application, using a combination of a white light source and a plurality of primary color light sources.

FIG. 23 is a cross sectional view of another example of a wall washer type fixture 350. The fixture 350 includes an optical integrating cavity 351 having a diffusely reflective inner surface, as in the earlier examples. In this fixture, the cavity 351 again has a substantially rectangular cross-section. As shown, the fixture 350 includes at least one white light source, represented by the white LED 355. The fixture also includes several LEDs 359 of the various primary colors, typically red (R), green (G) and blue (B, not visible in this cross-sectional view). The LEDs 359 include both initially-active LEDs and sleeper LEDs, and the LEDs 359 are similar to those in the earlier examples. Again, the LEDs emit controlled amounts of multiple colors of light into the optical integrating cavity 351 formed by the inner surfaces of a rectangular member 353. A power source and control circuit similar to those used in the earlier examples provide the drive currents for the LEDs 359, and in this example, that same circuit controls the drive current applied to the white LED 355. In view of the similarity, the power source and control circuit are omitted from FIG. 23, to simplify the illustration.

One or more apertures 357, of the shape desired to facilitate the particular lighting application, provide light passage for transmission of reflected and integrated light outward from the cavity 351. The aperture may be laterally centered, as in the earlier examples; however, in this example, the aperture is off-center to facilitate a light-through to the left (in the illustrated orientation). Materials for construction of the cavity and the types of LEDs that may be used are similar to those discussed relative to the earlier illumination examples.

Here, it is assumed that the fixture 350 is intended to principally provide white light, for example, to illuminate a wall or product to the left and somewhat above the fixture. The presence of the white light source 355 increases the intensity of white light that the fixture produces. The control of the outputs of the primary color LEDs 359 allows the operator to correct for any variations of the white light from the source 355 from normal white light and/or to adjust the color balance/temperature of the light output. For example, if the white light source 355 is an LED as shown, the white light it provides tends to be rather blue. The intensities of light output from the LEDs 359 can be adjusted to compensate for this blueness, for example, to provide a light output approximating sunlight or light from a common incandescent source, as or when desired.

As another example of operation, the fixture 350 may be used to illuminate products, e.g. as displayed in a store or the like, although it may be rotated or inverted for such a use. Different products may present a better impression if illuminated by white light having a different balance. For example, fresh bananas may be more attractive to a potential customer when illuminated by light having more yellow tones. Soda sold in red cans, however, may be more attractive to a potential customer when illuminated by light having more red tones. For each product, the user can adjust the intensities of the light outputs from the LEDs 359 and/or 355 to produce light that appears substantially white if observed directly by a human/customer but provides the desired highlighting tones and thereby optimizes lighting of the particular product that is on display.

The fixture 350 may have any desired output processing element(s), as discussed above with regard to various earlier examples. In the illustrated wall washer embodiment (FIG. 23), the fixture 350 includes a deflector to further process and direct the light emitted from the aperture 357 of the optical integrating cavity 351, in this case toward a wall or product somewhat to the left of and above the fixture 350. The deflector is formed by two opposing panels 365a and 365b having reflective inner surfaces 365a and 365b. Although other shapes may be used to direct the light output to the desired area or region, the illustration shows the panel 365a, 365b as relatively flat panels set at somewhat different angle extending to the left, in the illustrated orientation. Of course, as for all the examples, the fixture may be turned at any desired angle or orientation to direct the light to a particular region or object to be illuminated by the fixture, in a given application.

As noted, each panel 365a, 365b has a reflective interior surface 369a, 369b. As in the earlier examples, all or portions of the deflector surfaces may be diffusely reflective, quasi-specular or specular. In the wall washer example, the deflector panel surface 369b is diffusely reflective, and the deflector panel surface 369a has a specular reflectivity, to optimize distribution of emitted light over the desired area of the wall illuminated by the fixture 350. The output opening of the deflector 365 may be covered with a grating, a plate or lens, in a manner similar to the example of FIG. 17, although in the illustrated wall washer example, such an element is omitted.

Figure 24:
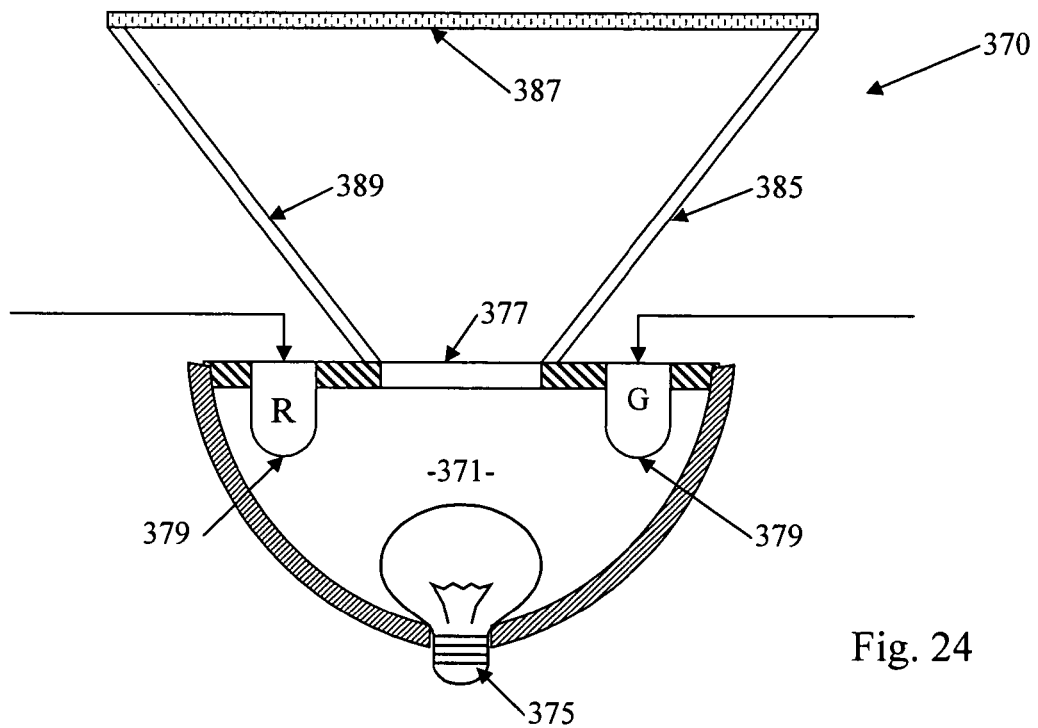
FIG. 24 is a cross-sectional view of another example of an optical cavity LED light fixture, in this case using a deflector and a combination of a white light source and a plurality of primary color light sources.

FIG. 24 is a cross-sectional view of another example of an optical integrating cavity type light fixture 370. This example uses a deflector and lens to optically process the light output, and like the example of FIG. 23 the fixture 370 includes LEDs to produce various colors of light in combination with a white light source. The fixture 370 includes an optical integrating cavity 371, formed by a dome and a cover plate, although other structures may be used to form the cavity. The surfaces of the dome and cover forming the interior surface(s) of the cavity 371 are diffusely reflective. One or more apertures 377, in this example formed through the cover plate, provide a light passage for transmission of reflected and integrated light outward from the cavity 371. Materials, sizes, orientation, positions and possible shapes for the elements forming the cavity and the types/numbers of LEDs have been discussed above.

As shown, the fixture 370 includes at least one white light source. Although the white light source could comprise one or more LEDs, as in the previous example (FIG. 23), in this embodiment, the white light source comprises a lamp 375. The lamp may be any convenient form of light bulb, such as an incandescent or fluorescent light bulb; and there may be one, two or more bulbs to produce a desired amount of white light. A preferred example of the lamp 375 is a quartz halogen light bulb. The fixture also includes several LEDs 379 of the various primary colors, typically red (R), green (G) and blue (B, not visible in this cross-sectional view), although additional colors may be provided or other color LEDs may be substituted for the RGB LEDs. Some LEDs will be active from initial operation. Other LEDs may be held in reserve as sleepers. The LEDs 379 are similar to those in the earlier examples, for emitting controlled amounts of multiple colors of light into the optical integrating cavity 371.

A power source and control circuit similar to those used in the earlier examples provide the drive currents for the LEDs 359. In view of the similarity, the power source and control circuit for the LEDs are omitted from FIG. 24, to simplify the illustration. The lamp 375 may be controlled by the same or similar circuitry, or the lamp may have a fixed power source.

The white light source 375 may be positioned at a point that is not directly visible through the aperture 377 similar to the positions of the LEDs 379. However, for applications requiring relatively high white light output intensity, it may be preferable to position the white light source 375 to emit a substantial portion of its light output directly through the aperture 377.

The fixture 370 may incorporate any of the further optical processing elements discussed above. For example, the fixture may include a variable iris and variable focus system, as in the embodiment of FIG. 16. In the illustrated version, however, the fixture 370 includes a deflector 385 to further process and direct the light emitted from the aperture 377 of the optical integrating cavity 371. The deflector 385 has a reflective interior surface 389 and expands outward laterally from the aperture, as it extends away from the cavity toward the region to be illuminated. In a circular implementation, the deflector 385 would be conical. Of course, for applications using other fixture shapes, the deflector may be formed by two or more panels of desired sizes and shapes. The interior surface 389 of the deflector 385 is reflective. As in the earlier examples, all or portions of the reflective deflector surface(s) may be diffusely reflective, quasi-specular, specular or combinations thereof.

As shown in FIG. 24, a small opening at a proximal end of the deflector 385 is coupled to the aperture 377 of the optical integrating cavity 311. The deflector 385 has a larger opening at a distal end thereof. The angle of the interior surface 389 and size of the distal opening of the deflector 385 define an angular field of radiant energy emission from the apparatus 370.

The large opening of the deflector 385 is covered with a grating, a plate or the exemplary lens 387. The lens 387 may be clear or translucent to provide a diffuse transmissive processing of the light passing out of the large opening. Prismatic materials, such as a sheet of microprism plastic or glass also may be used. In applications where a person may look directly at the fixture 370 from the illuminated region, it is preferable to use a translucent material for the lens 387, to shield the observer from directly viewing the lamp 375.

The fixture 370 thus includes a deflector 385 and lens 387, for optical processing of the integrated light emerging from the cavity 371 via the aperture 377. Of course, other optical processing elements may be used in place of or in combination with the deflector 385 and/or the lens 387, such as those discussed above relative to FIGS. 15A to 15C and 16.

In the fixture of FIG. 24, the lamp 375 provides substantially white light of relatively high intensity. The integration of the light from the LEDs 379 in the cavity 375 supplements the light from the lamp 375 with additional colors, and the amounts of the different colors of light from the LEDs can be precisely controlled. Control of the light added from the LEDs can provide color correction and/or adjustment, as discussed above relative to the embodiment of FIG. 23.

As shown by the discussion above, each of the various radiant energy emission systems with multiple color sources and an optical cavity to combine the energy from the sources provides a highly effective means to control the color produced by one or more fixtures. The output color characteristics are controlled simply by controlling the intensity of each of the sources supplying radiant energy to the chamber.

Settings for a desirable color are easily reused or transferred from one system/fixture to another. If color/temperature/balance offered by particular settings are found desirable, e.g. to light a particular product on display or to illuminate a particular person in a studio or theater, it is a simple matter to record those settings and apply them at a later time. Similarly, such settings may be readily applied to another system or fixture, e.g. if the product is displayed at another location or if the person is appearing in a different studio or theater. It may be helpful to consider the product and person lighting examples in somewhat more detail.

For the product, assume that a company will offer a new soft drink in a can having a substantial amount of red product markings. The company can test the product under lighting using one or more fixtures as described herein, to determine the optimum color to achieve a desired brilliant display. In a typical case, the light will generally be white to the observer. In the case of the red product container, the white light will have a relatively high level of red, to make the red markings seem to glow when the product is viewed by the casual observer/customer. When the company determines the appropriate settings for the new product, it can distribute those settings to the stores that will display and sell the product. The stores will use other fixtures of any type disclosed herein. The fixtures in the stores need not be of the exact same type that the company used during product testing. Each store uses the settings received from the company to establish the spectral characteristic(s) of the lighting applied to the product by the store's fixture(s), in our example, so that each product display provides the desired brilliant red illumination of the company's new soft drink product.

Consider now a studio lighting example for an actor or newscaster. The person is tested under lighting using one or more fixtures as described herein, to determine the optimum color to achieve desired appearance in video or film photography of the individual. Again, the light will generally be white to the observer, but each person will appear better at somewhat different temperature or color balance levels. One person might appear more healthy and natural under warmer light, whereas another might appear better under bluer/colder white light. After testing to determine the person's best light color settings, the settings are recorded. Each time the person appears under any lighting using the systems disclosed herein, in the same or a different studio, the technicians operating the lights can use the same settings to control the lighting and light the person with light of exactly the same spectral characteristic(s). Similar processes may be used to define a plurality of desirable lighting conditions for the actor or newscaster, for example, for illumination for different moods or different purposes of the individual's performances.

The methods for defining and transferring set conditions, e.g. for product lighting or personal lighting, can utilize manual recordings of settings and input of the settings to the different lighting systems. However, it is preferred to utilize digital control, in systems such as described above relative to FIGS. 10 and 12. Once input to a given lighting system, a particular set of parameters for a product or individual become another 'preset' lighting recipe stored in digital memory, which can be quickly and easily recalled and used each time that the particular product or person is to be illuminated.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An apparatus for emitting radiant energy, comprising:
a first of source of radiant energy of a first wavelength;
a second source of radiant energy of a second wavelength, the second wavelength being different from the first wavelength;
an optical cavity having a diffusely reflective interior surface for receiving and combining radiant energy of the first and second wavelengths from the sources of radiant energy, and having an aperture for allowing emission of combined radiant energy containing both radiant energy of the first wavelength and radiant energy of the second wavelength; and
an optical processing element coupled to the aperture of the optical cavity.

2. The apparatus of claim 1, wherein the optical processing element comprises a deflector having a reflective inner surface coupled to the aperture to deflect at least some of the combined radiant energy.

3. The apparatus of claim 2, wherein at least a substantial portion of the reflective inner surface of the deflector exhibits a diffuse reflective characteristic with respect to the combined radiant energy.

4. The apparatus of claim 2, wherein:
a first portion of the reflective inner surface of the deflector exhibits a diffuse reflective characteristic with respect to the combined radiant energy; and
a second portion of the reflective inner surface of the deflector exhibits a specular reflective characteristic with respect to the combined radiant energy.

5. The apparatus of claim 1, wherein the optical processing element comprises a variable opening iris.

6. The apparatus of claim 1, wherein the optical processing element comprises a variable focusing lens system.

7. The apparatus of claim 6, further comprising a variable opening iris located between the cavity and the variable focusing lens system.

8. The apparatus of claim 1, wherein the optical processing element comprises a collimator coupled to the aperture of the optical cavity.

9. The apparatus of claim 1, wherein the optical processing element comprises a transmissive diffuser coupled to the aperture of the optical cavity.

10. The apparatus of claim 9, wherein the transmissive diffuser comprises a lens.

11. The apparatus of claim 9, wherein the transmissive diffuser comprises a curved transmissive cover over the aperture of the optical cavity.

12. The apparatus of claim 9, wherein the transmissive diffuser comprises a holographic diffuser.

13. The apparatus of claim 1, further comprising control circuitry coupled to the first and second sources for establishing intensity of radiant energy from each of the sources, so as to set a spectral characteristic of the combined radiant energy emitted through the aperture and the optical processing element.

14. The apparatus of claim 1, wherein:
the first source comprises one or more light emitting diodes for emitting light of a first visible color; and
the second source comprises one or more light emitting diodes for emitting light of a second visible color, wherein the second color is different from the first color.

15. The apparatus of claim 14, wherein:
the one or more first color light emitting diodes comprise an initially active light emitting diode for emitting light of the first color and an initially inactive light emitting diode for emitting light of the first color on an as needed basis; and
the one or more second color light emitting diodes comprises an initially active light emitting diode for emitting light of the second color and an initially inactive light emitting diode for emitting light of the second color on an as needed basis.

16. The apparatus of claim 15, further comprising a third source for supplying radiant energy into the optical cavity for combination with the radiant energy of the first and second wavelengths, wherein the third source produces substantially white light.

17. The apparatus of claim 16, wherein third source comprises one or more white light emitting diodes.

18. The apparatus of claim 16, wherein third source comprises one or more incandescent or fluorescent light bulbs.

19. The apparatus of claim 1, further comprising a third source for supplying radiant energy of a third wavelength into the optical cavity for combination with the radiant energy of the first and second wavelengths, the third wavelength being different from the first wavelength and from the second wavelength.

20. The apparatus of claim 19, wherein:
the first source comprises one or more light emitting diodes for emitting light of a first visible color;
the second source comprises one or more light emitting diodes for emitting light of a second visible color, wherein the second color is different from the first color; and
the third source comprises one or more light emitting diodes for emitting light of a third visible color, wherein the third color is different from the first color and from the second color.

21. The apparatus of claim 20, wherein the first, second and third colors are red, green and blue, respectively.

22. A system comprising:
a plurality of apparatuses for emitting radiant energy, each as specified in claim 1; and
a master controller coupled to control each of the apparatuses, for providing a common control of all radiant energy emissions by the apparatuses.

23. A lighting system, for providing variable color lighting for studio or theater applications, the lighting system comprising:
a first of source of light of a first wavelength;
a second source of light of second wavelength, the second wavelength being different from the first wavelength;
an optical cavity having a diffusely reflective interior surface for receiving and combining light of the first and second wavelengths from the sources, and having an aperture for allowing emission of combined light of both the first wavelength and the second wavelength;

a variable opening iris optically coupled to the aperture of the optical cavity, for controlling an amount of the combined light emitted toward a subject to be illuminated; and control circuitry coupled to the first and second sources for establishing intensity of light from the sources, so as to set a spectral characteristic of the combined light directed toward the subject to be illuminated in the studio or theater.

24. The lighting system of claim 23, further comprising a variable focusing lens system, for adjustably focusing the combined light emitted through the iris toward the subject to be illuminated.

25. The lighting system of claim 23, wherein:
the first source comprises one or more light emitting diodes for emitting light of a first visible color; and
the second source comprises one or more light emitting diodes for emitting light of a second visible color, wherein the second color is different from the first color.

26. The lighting system of claim 25, wherein the control circuitry comprises:
a color sensor responsive to the combined light; and
logic circuitry responsive to color detected by the sensor to control output intensity of the one or more first color light emitting diodes and intensity of the one or more second color light emitting diodes, so as to provide a desired color distribution in the combined light directed toward the subject to be illuminated in the studio or theater.

27. The lighting system of claim 25, wherein:
the one or more first color light emitting diodes comprise an initially active light emitting diode for emitting light of the first color and an initially inactive diode for emitting light of the first color on an as needed basis; and
the one ore more second color light emitting diodes comprises an initially active light emitting diode for emitting light of the second color and an initially inactive diode for emitting light of the second color on an as needed basis.

28. The lighting system of claim 27, wherein the control circuitry comprises:
a color sensor responsive to the combined light; and
logic circuitry responsive to color detected by the sensor to control output intensity of the one or more first color light emitting diodes and intensity of the one or more second color light emitting diodes, so as to provide a desired color distribution in the combined light directed toward the subject to be illuminated in the studio or theater, and
wherein the logic circuitry is responsive to the detected color to selectively activate the inactive light emitting diodes, as needed to maintain the desired color distribution in the integrated radiant energy.

29. The lighting system of claim 25, further comprising one or more light emitting diodes for supplying substantially white light into the optical cavity for combination with the light of the first and second wavelengths.

30. The lighting system of claim 23, further comprising a third source for supplying substantially white light into the optical cavity for combination with the light of the first and second wavelengths.

31. The lighting system of claim 30, wherein the third source comprises one or more incandescent or fluorescent light bulbs.

32. A lighting network comprising:
a plurality of lighting systems, each as specified in claim 23; and
a master controller communicatively networked to the control circuitry of each of the lighting systems, for providing a common control of all light emissions by the lighting systems.

33. A lighting fixture, for a luminous lighting application, the fixture comprising:
a first of source of light of a first wavelength;
a second source of light of second wavelength, the second wavelength being different from the first wavelength;
an optical cavity having a diffusely reflective interior surface for receiving and combining light of the first and second wavelengths from the sources, and having an aperture for allowing emission of combined light of both the first wavelength and the second wavelength; and
at least one optical processing element coupled to the aperture of the optical cavity, for processing the combined light in a manner facilitating the luminous lighting application.

34. The lighting fixture of claim 33, wherein the at least one optical processing element comprises a reflective deflector shaped like a number, character, letter, or symbol, having a proximal opening coupled to the aperture of the optical cavity.

35. The lighting fixture of claim 34, further comprising a transmissive light diffusing member across a distal opening of the deflector.

36. The lighting fixture of claim 33, wherein the aperture is shaped like a number, character, letter, or symbol.

37. The lighting fixture of claim 33, in combination with control circuitry coupled to the first and second sources for establishing output intensity of light output of each of the sources, so as to set a spectral characteristic of the combined light emitted by the fixture.

38. A method of illuminating a subject, comprising:
generating a variable amount of light of a first wavelength and a variable amount of light of a second wavelength, wherein the second wavelength is different from the first wavelength;
optically combining the light of the first wavelength with the light of the second wavelength;
illuminating the subject with the combined light;
adjusting the amount of the light of the first wavelength or the amount of the light of the second wavelength, to achieve a color characteristic of a desired illumination of the subject with the combined light;
recording the amount of the light of the first wavelength and the amount of the light of the second wavelength contained in the combined light used to achieve the desired illumination of the subject;
setting a lighting system to generate the recorded amount of the light of the first wavelength and to generate the recorded amount of the light of the second wavelength;
operating the lighting system to generate the set recorded amounts of light of the first and second wavelengths;
optically combining the light of the first and second wavelengths generated by the lighting system to produce a combined light output corresponding to the desired illumination; and
irradiating the subject with the combined light output from the lighting system, to achieve the desired illumination of the subject using the lighting system.

39. The method of claim 38, wherein the subject illuminated comprises one or more examples of a particular product.

40. The method of claim 38, wherein the subject illuminated is a particular person.

41. The method of claim 38, wherein the step of optically combining the light of the first and second wavelengths generated by the lighting system, comprises:
diffusely reflecting the light of the first and second wavelengths generated by the lighting system within a cavity; and
emitting the light of the first and second wavelengths through an aperture of the cavity as the combined light output.

42. The method of claim 41, wherein the setting step comprises:
setting an intensity of illumination of a source of the light of the first wavelength for the lighting system to the recorded amount of the light of the first wavelength; and
setting an intensity of illumination of a source of the light of the second wavelength for the lighting system to the recorded amount of the light of the second wavelength.

43. A method of illuminating a subject with light of a desired color characteristic, comprising:
setting a first amount for light of a first wavelength;
generating light of the first wavelength from a first source, in a first intensity corresponding to the first set amount;
setting a second amount for light of a second wavelength;
generating light of the second wavelength from a second source, in a second intensity corresponding to the second set amount; wherein the second wavelength is different from the first wavelength, and the first and second set amounts correspond to the desired color characteristic for the illumination of the subject;
diffusely reflecting the generated light of the first and second wavelengths from the first and second sources within a cavity, to produce combined light containing amounts of light of the first and second wavelengths in proportion to the first and second set amounts; and
emitting at least a portion of the combined light through an aperture of the cavity to illuminate the subject with light of the desired color characteristic.

44. The method of claim 43, wherein the subject illuminated comprises a particular product.

45. The method of claim 43, wherein the subject illuminated is a particular person.

46. The method of claim 43, further comprising adjusting an opening of an iris optically coupled to the aperture, to control overall intensity of the combined light from the cavity illuminating the subject.

* * * * *